United States Patent
Okada et al.

(10) Patent No.: US 10,712,203 B2
(45) Date of Patent: Jul. 14, 2020

(54) COLOR CALIBRATION DEVICE, COLOR CALIBRATION SYSTEM, COLOR CALIBRATION HOLOGRAM, COLOR CALIBRATION METHOD, AND PROGRAM

(71) Applicant: TOPPAN PRINTING CO., LTD., Tokyo (JP)

(72) Inventors: Takashi Okada, Tokyo (JP); Tomohito Masuda, Tokyo (JP); Tetsuro Morimoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/258,569

(22) Filed: Jan. 26, 2019

(65) Prior Publication Data

US 2019/0170585 A1    Jun. 6, 2019

Related U.S. Application Data

(63) Continuation of application No. PCT/JP2017/025569, filed on Jul. 13, 2017.

(30) Foreign Application Priority Data

Jul. 27, 2016 (JP) .................................. 2016-147311
Oct. 18, 2016 (JP) .................................. 2016-204397

(51) Int. Cl.
*G01J 1/52* (2006.01)
*G01J 3/52* (2006.01)
(Continued)

(52) U.S. Cl.
CPC .............. *G01J 3/52* (2013.01); *B42D 25/328* (2014.10); *G01J 3/02* (2013.01); *G01J 3/50* (2013.01);
(Continued)

(58) Field of Classification Search
CPC ........................................................ G01J 3/52
(Continued)

(56) References Cited

U.S. PATENT DOCUMENTS 4,561,731 A * 12/1985 Kley ................. G02F 1/134309
349/1
4,806,776 A * 2/1989 Kley .................... G02B 21/088
250/225

(Continued)

FOREIGN PATENT DOCUMENTS

JP     H0843026 A     2/1996
JP     2005-045438 A  2/2005
(Continued)

OTHER PUBLICATIONS

International Searching Authority, "International Search Report," issued in connection with International Patent Application No. PCT/JP2017/025569, dated Oct. 3, 2017.
(Continued)

*Primary Examiner* — Kara E. Geisel
*Assistant Examiner* — Omar H Nixon
(74) *Attorney, Agent, or Firm* — Foley & Lardner LLP

(57) ABSTRACT

This color calibration device is a color calibration device, calibrating colors in a captured image of a first imaging device between different imaging devices using a hologram emitting diffracted light at different frequencies corresponding to an observation angle, the color calibration device includes: a diffracted light spectral distribution calculation unit that obtains respective diffracted light spectral distribution of the diffracted light from the hologram; a camera sensitivity function estimation unit that estimates spectral sensitivity of the imaging device from the respective diffracted light spectral distribution of the diffracted light and each captured image of the diffracted light; and a color
(Continued)

calibration unit that calibrates difference in color of the first imaging device relative to a second imaging device different from the first imaging device using the estimated spectral sensitivity.

11 Claims, 13 Drawing Sheets

(51) Int. Cl.
*G01J 3/02* (2006.01)
*G01J 3/50* (2006.01)
*G02B 5/32* (2006.01)
*G03H 1/26* (2006.01)
*H04N 9/04* (2006.01)
*B42D 25/328* (2014.01)
*G06T 7/90* (2017.01)
*G06K 9/46* (2006.01)

(52) U.S. Cl.
CPC ............... *G01J 3/524* (2013.01); *G02B 5/32* (2013.01); *G03H 1/26* (2013.01); *G06K 9/4652* (2013.01); *G06T 7/90* (2017.01); *H04N 9/04* (2013.01)

(58) Field of Classification Search
USPC .......................................................... 356/328
See application file for complete search history.

(56) References Cited

U.S. PATENT DOCUMENTS

| 4,898,467 | A  | * | 2/1990  | Milch ...................... G01J 3/04 356/328 |
| 7,768,641 | B2 |   | 8/2010  | Bearman et al. |
| 2008/0141169 | A1 | * | 6/2008 | Sakura ............... H04N 1/00132 715/810 |
| 2009/0302120 | A1 | * | 12/2009 | Omura ..................... G03H 1/02 235/492 |
| 2010/0097673 | A1 | * | 4/2010 | Cable ....................... G03H 1/02 359/9 |
| 2012/0044540 | A1 | * | 2/2012 | Dalal ................... H04N 1/6033 358/1.18 |
| 2012/0296595 | A1 | * | 11/2012 | Dalal ....................... G01J 3/501 702/104 |
| 2013/0169998 | A1 | * | 7/2013 | Tagami .............. H04N 1/00005 358/404 |
| 2014/0028011 | A1 | * | 1/2014 | Yamauchi ................. B41M 3/14 283/74 |
| 2014/0041242 | A1 | * | 2/2014 | Engel ................... G01B 11/005 33/502 |
| 2015/0043817 | A1 | * | 2/2015 | Nakamura ............. G06T 5/007 382/167 |
| 2015/0161798 | A1 | * | 6/2015 | Venkataraman .......... G01P 3/38 348/47 |
| 2015/0189304 | A1 | * | 7/2015 | Bretscher ............... H04N 19/50 382/238 |
| 2015/0235114 | A1 | * | 8/2015 | Kubota ................ G01N 21/278 358/1.9 |
| 2015/0264337 | A1 | * | 9/2015 | Venkataraman .......... G01P 3/38 348/47 |
| 2016/0227209 | A1 | * | 8/2016 | Kunkel ................ H04N 17/004 |

FOREIGN PATENT DOCUMENTS

| JP | 2005-057681 | A  |   | 3/2005  |         |
| JP | 2005-257438 | A  |   | 9/2005  |         |
| JP | 4136820 | B2 |   | 8/2008  |         |
| JP | 5097927 | B2 |   | 12/2012 |         |
| WO | WO-2009/066297 | A2 |   | 5/2009  |         |
| WO | WO-2015159247 | A1 | * | 10/2015 | ............. G07D 7/121 |

OTHER PUBLICATIONS

International Searching Authority, "Written Opinion," issued in connection with International Patent Application No. PCT/JP2017/025569, dated Oct. 3, 2017.

Extended European Search Report issued in the corresponding EP Patent Application Ser. No. 17834056.8, dated Aug. 12, 2019.

* cited by examiner

| CAPTURED IMAGE DATA IDENTIFICATION INFORMATION | OBSERVATION ANGLE | OBSERVATION POSITION | CAPTURED IMAGE DATA ADDRESS |
|---|---|---|---|
| ***** | ***** | ***** | ***** |
| ***** | ***** | ***** | ***** |
| ***** | ***** | ***** | ***** |

COLOR CALIBRATION DEVICE, COLOR CALIBRATION SYSTEM, COLOR CALIBRATION HOLOGRAM, COLOR CALIBRATION METHOD, AND PROGRAM

CROSS-REFERENCE TO RELATED PATENT APPLICATIONS

This application is a Bypass Continuation of International Patent Application No. PCT/JP2017/025569, filed on Jul. 13, 2017, which is based upon and claims the benefit of priority of Japanese Patent Application No. 2016-147311, filed on Jul. 27, 2016 and Japanese Patent Application No. 2016-204397, filed on Oct. 18, 2016. The entire contents of all of these are hereby incorporated by reference in their entireties.

TECHNICAL FIELD

The present invention relates to a color calibration device, a color calibration system, a color calibration hologram, a color calibration method, and a program for imaging devices, such as a camera.

BACKGROUND ART

In recent years, imaging devices, such as various cameras, have been sold from manufacturers. However, such imaging devices from the manufacturers are not standardized in hardware specifications and development process, which may result in color information of captured image data not being able to be handled as the same color value.

For example, an imaging device converts color information of captured image data, which is a captured color image of a subject, into an RGB (Red, Green, Blue) signal represented by the three primary colors of light, and then outputs the RGB signal to an image output device, such as a display device and a printing device (printer). Such an image output device generally reproduces a color image based on a signal value of the supplied (inputted) RGB signal.

The RGB signal obtained by the imaging device, however, depends on hardware properties, including spectral transmittance of an optical system such as an imaging lens, and of an RGB filter (filter of the RGB primary color system), and software image processing, such as white balance adjustment, gamma correction, and tone mapping.

Further, such image output devices also have various reproduction methods and individual differences. Due to these differences, even when the same color information is inputted at a spectral level for output of an image captured by such an imaging device from an image output device, the color actually reproduced (signal value of RGB signal) may be different from that of the captured image, resulting in failure of correct color reproduction.

To cope with such a situation, a standardized color signal in accordance with sRGB (standard RGB) and the like is often employed for passing captured image data between the imaging device and the image output device. In this case, in the imaging device, an RGB signal recorded in a CCD (charge coupled device) and the like by an imaging system is subjected to color correction in accordance with the sRGB standard and to output captured image data including the color corrected color information of the sRGB standard. With this configuration, an sRGB standard compliant image output device achieves correct color reproduction of a color image using sRGB standard compliant captured image data supplied from (outputted from) an imaging device.

There is a plurality of such techniques of color correction in accordance with the sRGB standard. For example, a configuration is proposed that approximates reproduced color in color reproduction by optically configuring spectral properties of an optical filter provided in the imaging device to match the sRGB standard.

Each manufacturer, however, often produces an original optical filter with various properties for improvement in image quality. Therefore, it is realistically difficult to get spectral properties of such an optical filter to fully optically match with the sRGB standard.

Similarly, in image processing to generate captured image data of the sRGB standard from captured RAW data, each manufacturer often applies processing to produce an image which is natural in appearance using an original image processing engine, and thus correct color reproduction of a color image is also difficult.

Meanwhile, a generally used method approximates reproduced color to target color by electrical correction, in which an RGB signal is subjected to matrix calculation (see, for example, PTLs 1 and 2).

The above electrical color correction method where an RGB signal is subjected to matrix calculation creates a profile of hardware properties for each imaging device using RAW data capturing a color chart, such as a Macbeth color chart, for color calibration to correct differences between various imaging devices.

As described above, estimation of color properties of an imaging device using a color chart allows correct color reproduction by the imaging device.

CITATION LIST

[Patent Literature] [PTL 1] JP 4136820 B2; [PTL 2] JP 5097927 B2

SUMMARY OF THE INVENTION

Technical Problem

A general color chart, such as a Macbeth color chart, however, has a surface with diffuse reflection properties and is thus affected by all light sources including ambient light. Accordingly, the entire color chart has to be captured without being exposed to light in a different manner by using covers or the like.

Since a phenomenon of metamerism sometimes occurs depending on the spectral distribution of the light source, a large number, for example 24 types, of color chips with various spectral reflectances have to be aligned in parallel to correctly determine the color properties of the imaging device, causing an increase in the size of the color chart.

For the reason described above, a color chart and an imaging object subjected to color correction are not allowed to be captured at the same time. Therefore, the color chart is captured to create a profile of the hardware properties for each imaging device, followed by imaging of the imaging object subjected to color correction.

As a result, it is difficult to match the ambient light in capturing the color chart with the ambient light in capturing the imaging object, and thus the created profile turns out to have properties based on the differences in the ambient light. As a result, there is a possibility that the color correction using this profile is not capable of highly accurate color reproduction.

The present invention has been made in view of such a situation and provides a color calibration device, a color calibration system, a color calibration hologram, a color calibration method, and a program that are capable of generating a profile of hardware properties for color correction between imaging devices without being affected by ambient light different from the case of using a color chart described above.

Desired Improvement or Solution to Problem

To attempt to improve or even solve the problems described above, a color calibration device of a first aspect of the present invention is a color calibration device for calibrating colors in a captured image of the first imaging device between different imaging devices using a hologram emitting diffracted light at different frequencies corresponding to an observation angle, the color calibration device including: a diffracted light spectral distribution calculation unit that obtains a respective diffracted light spectral distribution of the diffracted light from the hologram; a camera sensitivity function estimation unit that estimates spectral sensitivity of the imaging device from the respective diffracted light spectral distribution of the diffracted light and each captured image of the diffracted light; and a color calibration unit that calibrates difference in color of the first imaging device relative to the second imaging device different from the first imaging device using the estimated spectral sensitivity.

In a color calibration device of a second aspect of the present invention, according to the color calibration device in the first aspect, the imaging device further includes an observation angle estimation unit that estimates an observation angle and an observation position of imaging of the hologram from the captured image imaged by the imaging device. In addition, the diffracted light spectral distribution calculation unit calculates the respective diffracted light spectral distribution of the diffracted light using the observation angle and the observation position estimated from each captured image of the diffracted light.

In a color calibration device of a third aspect of the present invention according to the first or second aspect, the camera sensitivity function estimation unit estimates the spectral sensitivity of the imaging device from the respective diffracted light spectral distribution of the diffracted light and respective light intensity of the captured image of the diffracted light at a corresponding frequency.

A color calibration device of a fourth aspect of the present invention, according to any one of the first to third aspects, further includes an imaging operation instruction unit that outputs information instructing an operation to capture all captured images having diffracted light spectral distribution respectively corresponding to a plurality of items of required diffracted light spectral distribution set in advance.

In a color calibration device of a fifth aspect of the present invention according to the fourth aspect, the imaging operation instruction unit determines whether the captured image having the diffracted light spectral distribution corresponding to the required diffracted light spectral distribution is imaged, and if the captured image of the diffracted light spectral distribution is not imaged, outputs a notification, on the display unit of the imaging device, to prompt imaging of the captured image having the diffracted light spectral distribution.

In a color calibration device of a sixth aspect of the present invention according to the fifth aspect, the imaging operation instruction unit displays, on the display unit, an imaging direction to image the captured image of the diffracted light spectral distribution corresponding to the required diffracted light spectral distribution which has not yet been obtained.

In a color calibration device of a seventh aspect of the present invention according to the fifth or sixth aspect, the imaging operation instruction unit displays an imaging frame of the hologram on a display screen of the display unit, to define an imaging position of the captured image for imaging of the captured image having the diffracted light spectral distribution corresponding to the required diffracted light spectral distribution.

A color calibration system of an eighth aspect of the present invention includes: a color calibration hologram that emits diffracted light at different frequencies corresponding to an observation angle; a spectral distribution calculation unit that obtains respective spectral distribution of the diffracted light from the color calibration hologram; a camera sensitivity function estimation unit that estimates spectral sensitivity of an imaging device from the respective spectral distribution of the diffracted light and each captured image of the diffracted light; and a color calibration unit that calibrates difference in color of the first imaging device relative to the second imaging device different from the first imaging device using the estimated spectral sensitivity.

In a color calibration system of a ninth aspect of the present invention according to the eighth aspect, the color calibration hologram is provided adjacent to an imaging object imaged as a captured image for calibration of the difference in color.

In a color calibration system of a tenth aspect of the present invention according to the ninth aspect, the imaging object is an anti-counterfeiting medium used for authentication determination of an article and having an observed light pattern changing with change in a light property as a property of irradiated light.

A color calibration system of an eleventh aspect of the present invention according to any one of the eighth to tenth aspects further includes an imaging operation instruction unit that outputs information instructing an operation to capture all captured images having diffracted light spectral distribution respectively corresponding to a plurality of items of required diffracted light spectral distribution set in advance.

A color calibration hologram of a twelfth aspect of the present invention emits diffracted light at different frequencies corresponding to an observation angle, wherein the hologram is used to obtain spectral sensitivity for calibrating colors in a captured image of the first imaging device between different imaging devices.

In a color calibration hologram of a thirteenth aspect of the present invention according to the twelfth aspect, the hologram is provided adjacent to an imaging object imaged as a captured image for calibration of the difference in color.

In a color calibration hologram of a fourteenth aspect of the present invention according to the thirteenth aspect, the imaging object is an anti-counterfeiting medium used for authentication determination of an article and having an observed light pattern varying with change in a light property as a property of irradiated light.

In a color calibration method of a fifteenth aspect of the present invention, calibrating colors in a captured image of the first imaging device between different imaging devices using a hologram emitting diffracted light at different frequencies corresponding to an observation angle, the color calibration method includes: a step of calculating diffracted light spectral distribution to obtain respective diffracted light spectral distribution of the diffracted light from the hologram; a step of estimating a spectral sensitivity to estimate spectral sensitivity of the imaging device from the respective diffracted light spectral distribution of the diffracted light and each captured image of the diffracted light; and a step of calibrating colors to calibrate difference in color of the first imaging device relative to the second imaging device different from the first imaging device using the estimated spectral sensitivity.

In a color calibration method of a sixteenth aspect of the present invention according to the fifteenth aspect further includes a step of instructing an imaging operation to output information instructing an operation to capture all captured images having diffracted light spectral distribution respectively corresponding to a plurality of items of required diffracted light spectral distribution set in advance.

In a program of a seventeenth aspect of the present invention causing a computer to execute an operation to calibrate colors in a captured image of the first imaging device between different imaging devices using a hologram emitting diffracted light at different frequencies corresponding to an observation angle, the program causes the computer to operate as: a diffracted light spectral distribution calculation means to obtain respective diffracted light spectral distribution of the diffracted light from the hologram; a spectral sensitivity estimation means to estimate spectral sensitivity of the imaging device from the respective diffracted light spectral distribution of the diffracted light and each captured image of the diffracted light; and a color calibration means to calibrate difference in color of the first imaging device relative to the second imaging device different from the first imaging device using the estimated spectral sensitivity.

A program of an eighteenth aspect of the present invention according to the seventeenth aspect causes the computer to further operate as an imaging operation instruction means to output information instructing an operation to capture all captured images having diffracted light spectral distribution respectively corresponding to a plurality of items of required diffracted light spectral distribution set in advance.

Advantageous Effects of the Invention

As just described, according to the present invention, it is possible to provide a color calibration device, a color calibration system, a color calibration hologram, a color calibration method, and a program that are capable of generating a profile of hardware properties for color correction between imaging devices without being affected by ambient light, in a method different when using a color chart.

DETAILED DESCRIPTION

Representative embodiments or modes for carrying out the present invention will be described in detail below with reference to the accompanying drawings. However, it is to be understood that the invention is not necessarily limited to these representative embodiments, which are being provided to be illustrative of the invention. In the descriptions of the figures, like reference signs will be used for like elements to omit duplicate description.

First Embodiment

Figure 1:
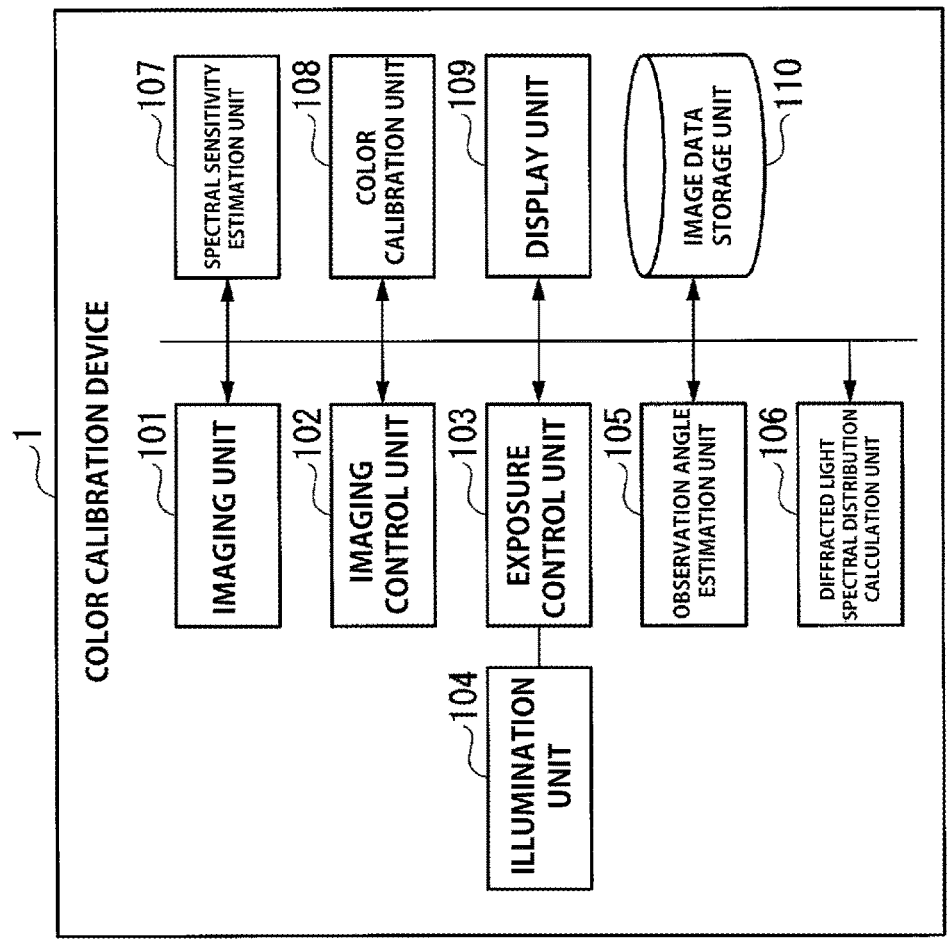
FIG. 1 is a block diagram illustrating an exemplary configuration of a color calibration system provided with a color calibration device according to a first embodiment.
Figure 1:
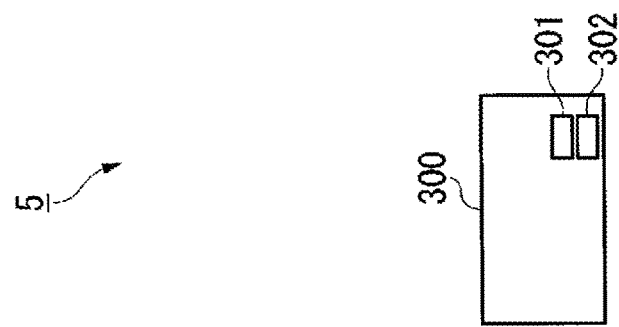

With reference to the drawings, a first embodiment of the present invention will be described. FIG. 1 is a block diagram illustrating an exemplary configuration of a color calibration system provided with a color calibration device according to the first embodiment. In FIG. 1, a color calibration device 1 is provided with an imaging unit (imaging device) 101, an imaging control unit 102, an exposure control unit 103, an illumination unit 104, an observation angle estimation unit 105, a diffracted light spectral distribution calculation unit 106, a camera sensitivity function estimation unit 107, a color calibration unit 108, a display unit 109, and an image data storage unit 110. The color calibration device 1 in the first embodiment has the imaging unit 101 and the illumination unit 104 integrated therein and has a configuration corresponding to a color calibration process, using a hologram (a color calibration hologram 302 described later) emitting diffracted light in a retroreflection direction in correspondence with, for example, light emitted from the illumination unit 104 as a color calibration sheet for color calibration.

A credit card 300 is, for example, an object subjected to authentication determination and has a surface provided with an authentication determination hologram 301 as an anti-counterfeiting medium and a color calibration hologram 302 for color calibration. The credit card 300 is formed in a rectangular plate shape. The authentication determination hologram 301 is used for authentication determination of an article (credit card 300), where change in light properties as the properties of irradiated light changes the pattern of observed light. In the present embodiment, a color calibration system 5 is configured with the color calibration device 1 and the color calibration hologram 302. That is, the color calibration system 5 is provided with the color calibration device 1 and the color calibration hologram 302.

In the present embodiment, for accurate determination of the color of diffracted light emitted from the authentication determination hologram 301, spectral sensitivity in the optical system of the imaging unit 101 is obtained by the color calibration hologram 302. Using the spectral sensitivity thus obtained, calibration is then performed that changes color in the captured image data of the diffracted light imaged by the imaging unit 101 to standard color (color imaged by an imaging device having standard spectral sensitivity) for authentication determination.

The imaging unit 101 is, for example, a camera or the like using an imaging element such as a CCD (charge coupled device) or a CMOS (complementary metal oxide semiconductor) and converts RAW image data (described later) of an object into captured image data that is only demosaiced without image processing, such as white balance adjustment, and writes the captured image data in the image data storage unit 110 for storage. The image data storage unit 110 is a hard disk drive, a flash memory, or the like and is capable of storing data.

Figure 2:
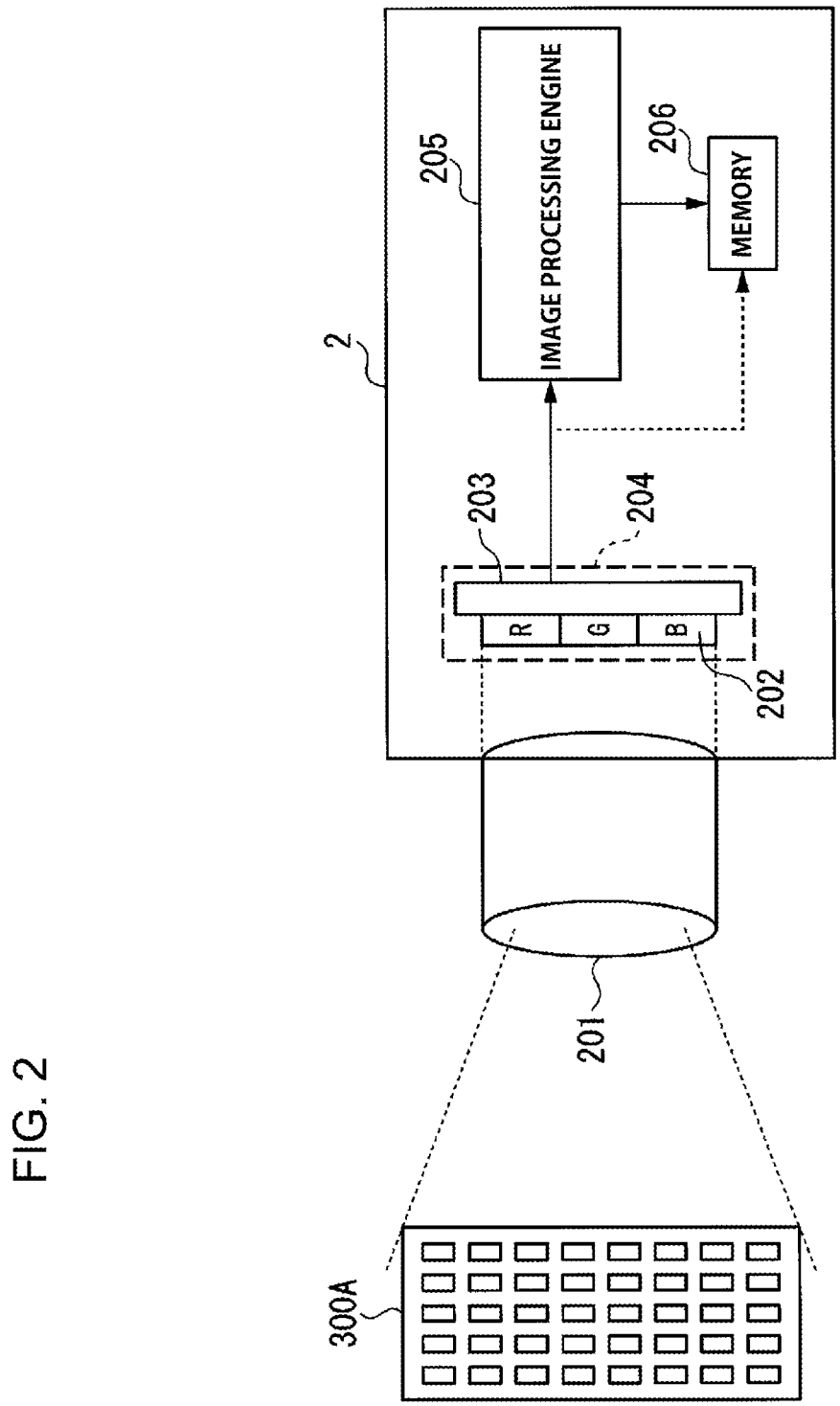
FIG. 2 is a diagram illustrating color signal processing of captured image data imaged by a general imaging device.

FIG. 2 is a diagram illustrating color signal processing of captured image data imaged by a general imaging device. With reference to FIG. 2, a description is given of color signal processing of a general imaging device, for example, a digital camera. An imaging device 2 is an imaging device able to obtain a full color image of a subject 300A (e.g., the credit card 300) using an imaging element, and is provided with an imaging optical system 201, such as a lens, an imaging element 204 composed of a color filter (a bandpass filter) 202 and a photodiode 203, an image processing engine 205, and a memory 206. In this situation, the imaging element 204 is, for example, a single panel CCD or CMOS with an RGB three-color color filter attached thereto. The area other than the image processing engine 205 in FIG. 2 corresponds to the imaging unit 101 in FIG. 1.

The imaging optical system 201 forms a subject image (light from the subject) on the photodiode 203 via the color filter 202.

The color filter 202 spectrally disperses the light from the subject, for each filter region of RGB, to respectively colored light (e.g., component light in the respective RGB wavelength bands) in accordance with the filter properties in the filter region, and emits the spectral light to the photodiode 203.

The photodiode 203 has light receiving devices to photoelectrically convert the respective incident colored light for output as RAW (acquired raw) data. In this situation, an A/D (analog/digital) converter, not shown, A/D converts the RAW data converted by the photodiode 203 and outputs the RAW data as digital data to the image processing engine 205. The configuration before output of the digitized RAW data to the image processing engine 205 corresponds to the imaging unit 101 in FIG. 1 as described above.

The image processing engine 205 applies various types of image processing, such as demosaicing to generate an RGB signal (a signal value) for each pixel in the captured image data, tone mapping, and white balance correction, to the RAW data supplied (inputted) from the A/D converter. The image processing engine 205 then converts the image processed RAW data into color defined by a standard, such as sRGB, followed by writing the data in a general image file format for captured image data, such as JPEG (joint photographic experts group) and TIFF (tagged image file format), in the memory 206 for storage.

Depending on the model and type of the digital camera, the RAW data before processing by the image processing engine 205 may be stored in the memory 206. The imaging unit 101 in the present embodiment may be provided with or without a memory. That is, the imaging unit 101 may be provided at least with a configuration equivalent to the imaging optical system 201 and the imaging element 204.

The imaging optical system 201 and the imaging element 204 described above have color properties represented as spectral sensitivity, which is sensitivity of color to each wavelength of the light, by adding the transmission properties of the lens and the optical filter (the color filter 202) as the optical system to sensitivity properties of the photodiode 203.

The digitized RAW data is thus recorded as a signal value obtained by multiplying spectral sensitivity of the respective RGB three-color components at each wavelength by the light emitted from the subject 300A for integration.

The process performed by the image processing engine 205 varies according to the respective manufacturer. The image processing engine 205 processes the captured image data to appear naturally to the eyes of a person viewing the image and performs process of converting color outside the color gamut of the sRGB standard into color within the color gamut by approximation. In such a manner, different types of image processing are performed on RAW data in the respective parts of the imaging device. Accordingly, the RAW data once converted into converted captured image data by image processing is generally not able to be inversely converted back into RAW data.

For this reason, in the present embodiment, spectral sensitivity in the imaging device is estimated using RAW data before applying image processing specific to the imaging device, that is, the captured image data itself without the specific image processing for color calibration of captured image data, which is RAW data between different image devices.

Figure 3:
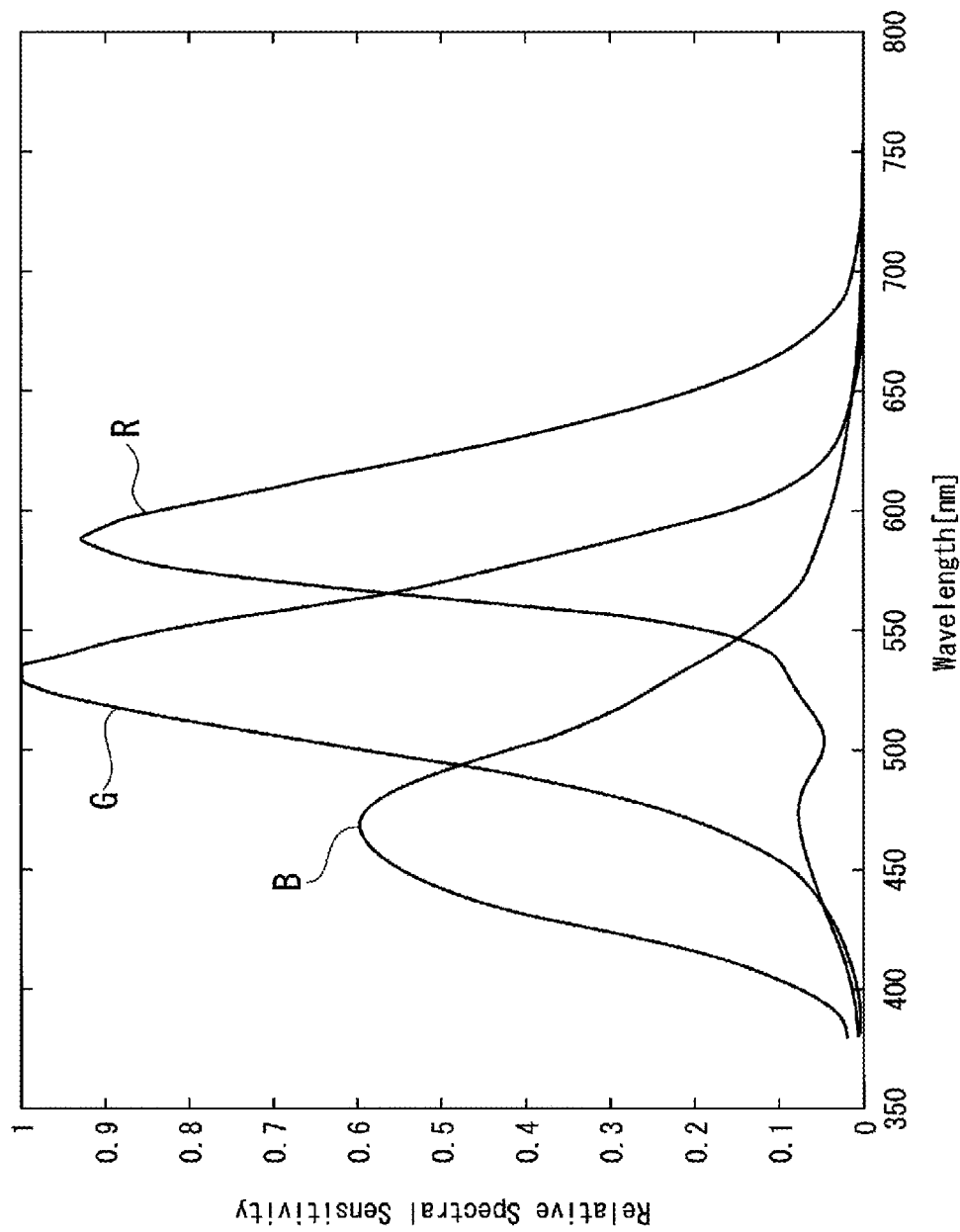
FIG. 3 is a diagram illustrating an example of spectral sensitivity of an imaging device.

FIG. 3 is a diagram illustrating an example of spectral sensitivity of the imaging device. In FIG. 3, the horizontal axis represents a wavelength of light and the vertical axis represents relative spectral sensitivity as the spectral sensitivity. The spectral sensitivity is a function taking a wavelength of light in a visible wavelength range (380 nm to 780 nm) as a variable. The spectral sensitivity is, since the color filter 202 has optical filters corresponding to the three color components of RGB, three types of functions independent of the respective RGB optical filters.

As described above, the spectral sensitivity is a sensitivity function representing relationship between incident light to the imaging device and a signal value of RAW data corresponding to the light. In this situation, regarding the spectral sensitivity, even when light incident to the imaging device is fixed in the amount of light and color, the amount of light increases or decreases (changes) due to the shutter speed upon imaging and the like and the entire signal value of the RAW data increases or decreases (changes) in proportion to the increase or decrease.

The absolute value itself of the spectral sensitivity is thus not important, and a relative value of a signal value for each spectrally dispersed wavelength is an important element to determine the color of a captured image. Accordingly, the spectral sensitivity in general is often represented as a function of numerical values of a normalized ratio where the maximum value in signal values at all wavelengths is 1.

Returning to FIG. 1, the imaging control unit 102 is configured to control imaging conditions of the imaging unit 101, such as a focal length and imaging element sensitivity (e.g., ISO (International Organization for Standardization) sensitivity), when the imaging unit 101 captures diffracted light emitted from holograms (referring respectively to the authentication determination hologram 301 and the color calibration hologram 302) in correspondence with incident light.

The exposure control unit 103 controls imaging conditions of the imaging unit 101, such as the shutter speed, the aperture ratio, and the intensity of the lighting, as exposure conditions for imaging. The exposure control unit 103 also outputs light emission instructions for adjustment and emission of light for imaging (lighting) to the illumination unit 104 as needed for imaging in correspondence with the brightness of the diffracted light of the hologram to be imaged by the color calibration device 1.

The illumination unit 104 may be not only a general illuminator continuously irradiating an imaging target with light but also a light-emitting device called a flash or a strobe (registered trademark) irradiating an imaging target with light for a short time.

The illumination unit 104 irradiates the imaging target with a predetermined intensity of light in response to the light emission instruction from the exposure control unit 103. The imaging control unit 102 described herein supplies (outputs) the exposure control unit 103 with a control signal indicating imaging timing. Accordingly, in synchronization with the control signal supplied (inputted) from the imaging control unit 102 for indicating an imaging timing, the exposure control unit 103 outputs a light emission instruction to the illumination unit 104 to emit illumination light for illuminating the hologram as described above.

The observation angle estimation unit 105 sequentially inputs each item of the captured image data in which a hologram is imaged from the imaging unit 101. The observation angle estimation unit 105 then obtains, from a coordinate transformation equation (described later), each of an observation position (coordinate values) as a position of the imaging unit 101 having imaged the captured image data and an imaging direction of the imaging unit 101 in a three-dimensional space where the inputted captured image data is imaged. That is, the observation angle estimation unit 105 obtains the observation angle of the hologram in each item of the captured image data from the observation position and the imaging direction thus obtained. That is, the observation angle estimation unit 105 obtains, from the obtained observation position and imaging direction, the observation angle of the hologram in the captured image data. The imaging direction is a direction facing the imaging element of the imaging unit 101, that is, a direction perpendicular to a light incident surface of the imaging element.

The observation angle estimation unit 105 writes and stores the captured image data information including the observation position and the imaging direction obtained as above, together with captured image data identification information added to the captured image data for identification of the captured image data, in a captured image data table for calibration of the image data storage unit 110. This observation angle causes a difference in the observed spectral distribution emitted from the hologram in response to the incident light.

In the present embodiment, a plurality of pieces of the image data of the hologram are imaged by the imaging unit 101 with a predetermined focal length. In this case, each piece of the captured image data has to be imaged respectively at a different observation angle in imaging. The observation angle estimation unit 105 uses, as described above, the preset coordinate transformation equation, thereby estimating the observation angle of each piece of the captured image data of the hologram in the three-dimensional space from the plurality of pieces of the captured image data.

The coordinate transformation equation used by the observation angle estimation unit 105 is an equation generated in such a manner that a pixel position in the two-dimensional coordinate space in each piece of the captured image data and a coordinate position in the three-dimensional space are correlated to each other when the three-dimensional space is reproduced from multiple pieces of the captured image data (the captured image data of a calibration board, which is described later) in advance as a pre-process for the color calibration process with the hologram (preparation for color calibration). The pre-generated coordinate transformation equation is written and stored in the image data storage unit 110.

Figure 4:
FIG. 4 is a chart illustrating an exemplary configuration of a captured image data table for calibration in image data storage unit.

FIG. 4 is a chart illustrating an exemplary configuration of the captured image data table for calibration in the image data storage unit 110. In the captured image data table for calibration shown in FIG. 4, in response to the captured image of the hologram, pieces of captured image data identification information, observation angles and observation positions of the captured image data corresponding to the pieces of captured image data identification information, and captured image data addresses are written and stored. The captured image data identification information here is information for identifying each of the captured image data. The image data storage unit 110 is able to store a plurality of items of captured image data acquired at different observation angles for imaging of one imaging object.

The observation angle refers to, for example, an angle formed between the imaging direction of the imaging unit 101 when capturing the image data and the line normal to the surface of the color calibration hologram 302, where the color calibration hologram 302 is placed in a coordinate system of a three-dimensional space (hereinafter referred to as a three-dimensional coordinate system) with the origin being at any one of vertices or coordinate points of the color calibration hologram 302. That is, the observation angle is an angle made between a virtual axis extending in the imaging direction and the normal line. The surface of the color calibration hologram 302 in the present embodiment is parallel to the surface of the credit card 300 in which the color calibration hologram 302 is provided. The observation position refers to a coordinate position at which the imaging unit 101 captures an image of the color calibration hologram 302 in the three-dimensional space. The captured image data address indicates the address of an area in the image data storage unit 110 where each captured image data is stored, which constitutes an index for reading the captured image data.

Figure 5:
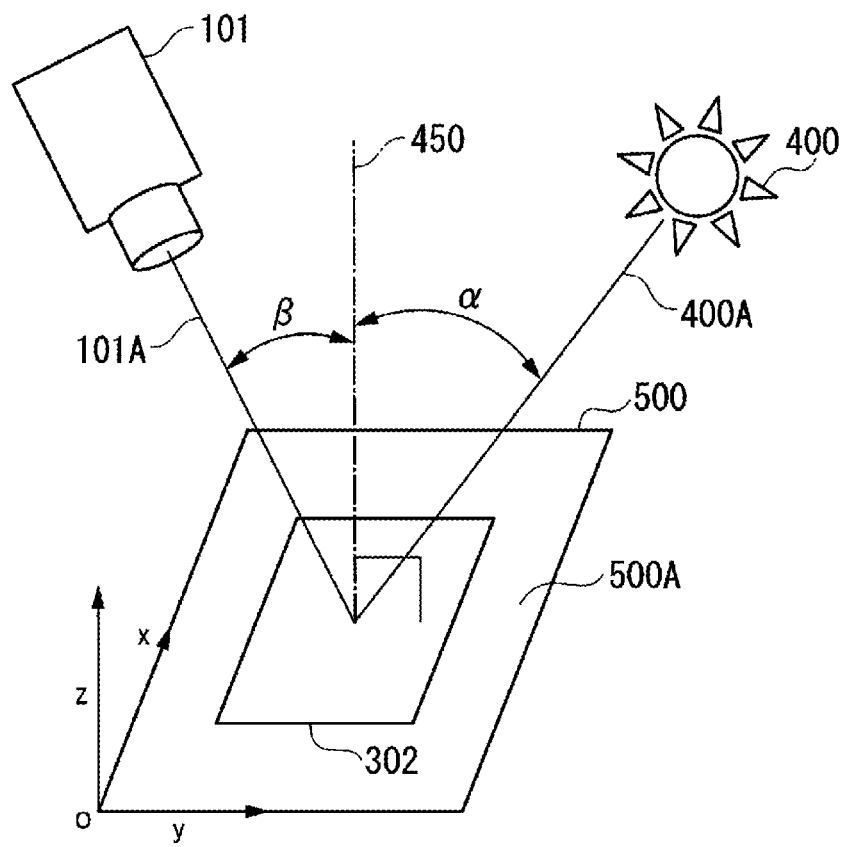
FIG. 5 is a diagram illustrating an observation angle of a hologram from an imaging unit.

FIG. 5 is a diagram illustrating the observation angle of the hologram from the imaging unit 101. In FIG. 5, a hologram color calibration sheet 500 (or the credit card 300) has a surface provided with the color calibration hologram 302. The hologram color calibration sheet 500 is formed in a rectangular plate shape. The color calibration hologram 302 is a hologram in which diffracted light changes with the observation angle. That is, the color calibration hologram 302 emits diffracted light at different frequencies (in other words, with different wavelengths) in correspondence with the observation angle. As the color calibration hologram 302, for example, a reflective hologram may be used that is composed of a diffraction grating using a metal foil, and reflects diffracted light. The surface of the color calibration hologram 302 may be provided with a protective film with transmission properties of less wavelength dependency to achieve a dirt-resistant structure.

A light source (also referred to as illumination) 400 is configured to irradiate the color calibration hologram 302 with imaging light at the irradiation angle α, which is an angle formed between a light irradiation direction 400A and a normal line 450. When the imaging light is incident, the color calibration hologram 302 emits diffracted light with predetermined spectral distribution (wavelength) at a predetermined observation angle β. The diffracted light emitted from the color calibration hologram 302 in correspondence with the irradiated light has different spectral distribution depending on the irradiation angle α and the observation angle β.

The normal line 450 is a normal line extending in a direction perpendicular to a surface 500A of the hologram color calibration sheet 500. An observation angle β is formed by an imaging direction 101A of the imaging unit 101 and the normal 450.

For example, the observation angle estimation unit 105 arranges the hologram color calibration sheet in a three-dimensional coordinate system such that a z axis is set parallel to the normal 450 and the sides of the hologram color calibration sheet 500 are parallel to an x axis and a y axis. For example, the observation angle estimation unit 105 arranges the hologram color calibration sheet 500 in a two-dimensional plane with the x axis and the y axis in the three-dimensional coordinate system such that any of vertexes formed by the sides of the hologram color calibration sheet 500 coincides with an origin point O in the three-dimensional coordinate system. Accordingly, the thickness direction of the hologram color calibration sheet 500 is parallel to the z axis. The three-dimensional shape of the hologram color calibration sheet 500 is written and stored in advance as known information together with the coordinate transformation equation described above in the image data storage unit 110.

In this situation, if the color calibration hologram 302 is arranged on the surface of the credit card 300 subjected to the authentication determination illustrated in FIG. 1, the same process as that for the hologram color calibration sheet 500 is applied to the credit card 300. In addition, on the surface of the credit card 300, the authentication determination hologram 301 is arranged so as to be adjacent to the color calibration hologram 302, as an anti-counterfeiting medium (imaging object).

In the case of using the hologram color calibration sheet 500, a process to obtain the spectral sensitivity of the imaging device to the optical system is performed. After that, the subject 300A is imaged and the captured image data is calibrated using the spectral sensitivity thus obtained.

In contrast, in the case of imaging the subject 300A and the hologram color calibration sheet 500 (color calibration hologram 302) at the same time, a user does not have to intentionally perform the process for color calibration.

That is, in the captured image data, the positions of the images of the subject 300A and the hologram color calibration sheet 500 are detected using the coordinate transformation equation. The spectral sensitivity is then obtained for each of the RGB color components of the pixels in the hologram color calibration sheet 500, and using the spectral sensitivity, the color of the pixels in the subject 300A is calibrated. Accordingly, the hologram color calibration sheet 500 does not have to be separately imaged for color calibration, and a user does not have to intentionally perform the process to obtain the spectral sensitivity used for calibration.

Returning to FIG. 1, when the observation angle for each piece of the captured image data is obtained, the observation angle estimation unit 105 reads the captured image data from the image data storage unit 110. Then, the observation angle estimation unit 105 associates each coordinate of the three-dimensional shape of the credit card 300 (or the hologram color calibration sheet 500) in the three-dimensional coordinate system and each pixel (each coordinate) of the captured image data (the two-dimensional coordinate system) with each other according to the above-described coordinate transformation equation, thereby obtaining the capture position of the image data in the three dimensional coordinate system of the three dimensional space and the capture direction of the image data from such a capture position. In this instance, as described above, the observation angle estimation unit 105 arranges the credit card 300 in the three-dimensional space with any of vertexes of the three-dimensional shape of the credit card 300 as an origin point in the three-dimensional coordinate system such that the normal 450 is parallel to the z axis and the sides of the credit card 300 are parallel to the x axis or the y axis.

Then, based on the three-dimensional shape of the credit card 300, the observation angle estimation unit 105 calculates an imaging position and an imaging direction of the imaging unit 101 capturing the image data in the three-dimensional coordinate system. Accordingly, the observation angle estimating unit 105 calculates an observation angle α formed between the normal line 450 and the imaging direction of the imaging unit 101. After the observation angle and the observation position are obtained, the captured image data is written and stored in a predetermined region of the image data storage unit 110, and the captured image data address as the address of the predetermined region, the captured image data identification information of the captured image data, and the observation angle and the observation position thus obtained are respectively written and stored in the captured image data table for calibration of the image data storage unit 110.

In this embodiment, the imaging unit 101 needs to undergo camera calibration in advance as a pre-requisite. The camera calibration is performed such that a calibration board of a known three-dimensional shape is imaged one or more times in an imaging area, and one or more captured image data are used to establish correspondences between a plurality of coordinate points in the three-dimensional coordinate system in the three-dimensional space and a plurality of coordinate points (two-dimensional pixels) of the captured image data in the two-dimensional coordinate system. With this configuration, the coordinate transformation equation indicating a relative positional relationship (hereinafter "extrinsic parameter") between the imaging unit 101 and the calibration board is estimated while the optical center of the imaging unit 101, a light beam incident direction vector at each pixel (each two-dimensional pixel), lens distortion, etc. (hereinafter "intrinsic parameters of the imaging unit 101") are estimated.

Specifically, in this embodiment, for the observation angle estimation unit 105 to estimate the observation angle of the captured image data, a global coordinate system (three-dimensional coordinate system) is restructured from the two-dimensional images of the calibration board captured in advance by the imaging unit 101 from a plurality of different viewpoint directions, that is, the multi-viewpoint captured image data. The coordinate transformation equation, which indicates a correlation between the coordinate points in the three-dimensional coordinate system re-configured in the same pixels and the coordinate points of the captured image data captured by the imaging unit 101 in the two-dimensional coordinate system, is acquired when the camera calibration is performed.

As described above, in the present embodiment, it is a precondition for the estimation of an observation angle that camera calibration is applied to the imaging unit 101 in advance, the intrinsic parameters of the imaging unit 101 are known during execution of the color calibration process for the hologram (the authentication determination hologram 301 and the color calibration hologram 302, respectively) in the color calibration system, and the three dimensional shapes of the credit card 300 (or the hologram color calibration sheet 500) and the hologram are known. This makes it possible to obtain the captured image data of the hologram from a plurality of different positions, acquire the information on a plurality of corresponding points between the coordinate points in the three-dimensional coordinate system and the pixels of the captured image data in the two-dimensional coordinate system using the coordinate transformation equation, and estimate the relative positional relationship between the imaging unit 101 and the hologram from the plurality of corresponding point information. That is, the observation position and observation angle (imaging direction) of the imaging unit 101 in capturing of an image of the hologram can be estimated.

In the present embodiment, a well-known technique, i.e., a technique according to Z. Zhang (Z. Zhang, "A flexible new technique for camera calibration," IEEE Transactions on Pattern Analysis and Machine Intelligence, Vol. 22, No. 11, pages 1330-1334, 2000), can be applied as an example of the camera calibration technique, thereby estimating the observation angle when the image data is captured. Note that in a case where the observation angle is estimated by application of the above-described calibration technique of Z. Zhang, the captured image data to be inputted to the color calibration system needs to be image data captured at a focal length (preferably, the same focal length) similar to a focal length fixed in camera calibration.

Returning to FIG. 1, the diffracted light spectral distribution calculation unit 106 sequentially reads information on the captured image data recorded by the observation angle estimation unit 105 from the captured image data table for calibration in the image data storage unit 110. The diffracted light spectral distribution calculation unit 106 then calculates the spectral distribution of the diffracted light (may be referred to as diffracted light spectral distribution) at each observation angle using the observation position and the observation angle respectively estimated by the observation angle estimation unit 105 from the spectral distribution of radiated light, given in advance, radiated by the light source 400 and diffracted light properties of the color calibration hologram 302 in accordance with the observation position and the observation angle similarly given in advance. The spectral distribution of the radiated light radiated by the light source 400 and the diffracted light properties of the color calibration hologram 302 in accordance with the observation position and the observation angle may be stored in an internal or external storage unit, not shown, of the color calibration device 1 or may be stored in the image data storage unit 110.

The diffracted light spectral distribution calculation unit 106 obtains the diffracted light spectral distribution of the respective diffracted light at different frequencies.

For example, a case is considered where the color calibration hologram 302 in FIG. 5 is a reflective hologram composed of a diffraction grating in a groove direction in parallel with the x axis direction and metal foil and both the light irradiation direction 400A and an imaging direction 101A are parallel to the y-z plane. The diffracted light incident from the light source 400 to the color calibration hologram 302 and observed by the imaging unit 101 is diffracted light (light with a single wavelength) with a diffracted light wavelength λd obtained by a relational expression represented by an equation (1) below with the light irradiation angle α, the observation angle β of the imaging unit 101, a spatial frequency f of the diffraction grating in the color calibration hologram 302, and the number of the order n of the diffracted light. That is, the λd indicates the wavelength of the diffracted light spectral distribution.

[Math. 1]

$$\lambda_d = \frac{1}{nf}(\sin\alpha \pm \sin\beta) \quad (1)$$

Figure 6A:
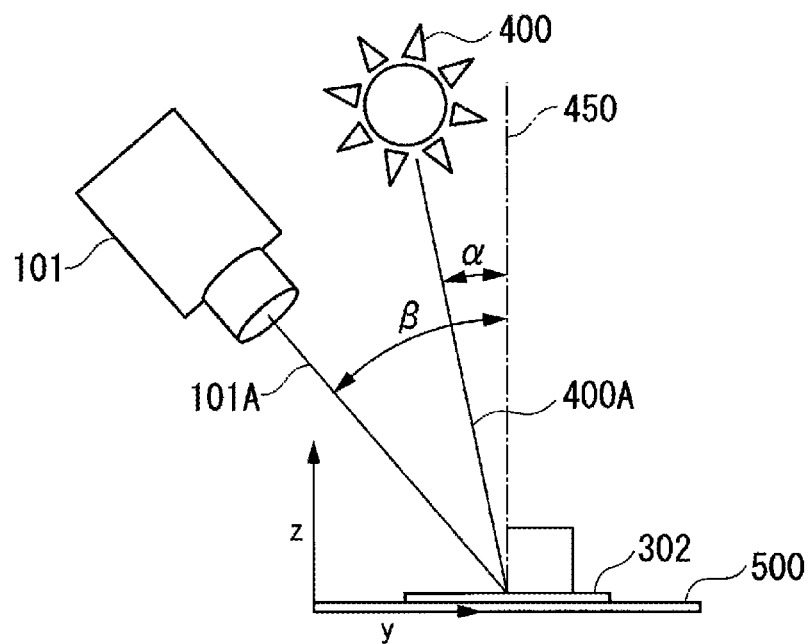
FIG. 6A is a diagram illustrating settings of a ± sign in an equation to obtain spectral distribution of diffracted light and the diagram illustrates the case where an imaging unit and a light source are located on one side of an imaging object.
Figure 6B:
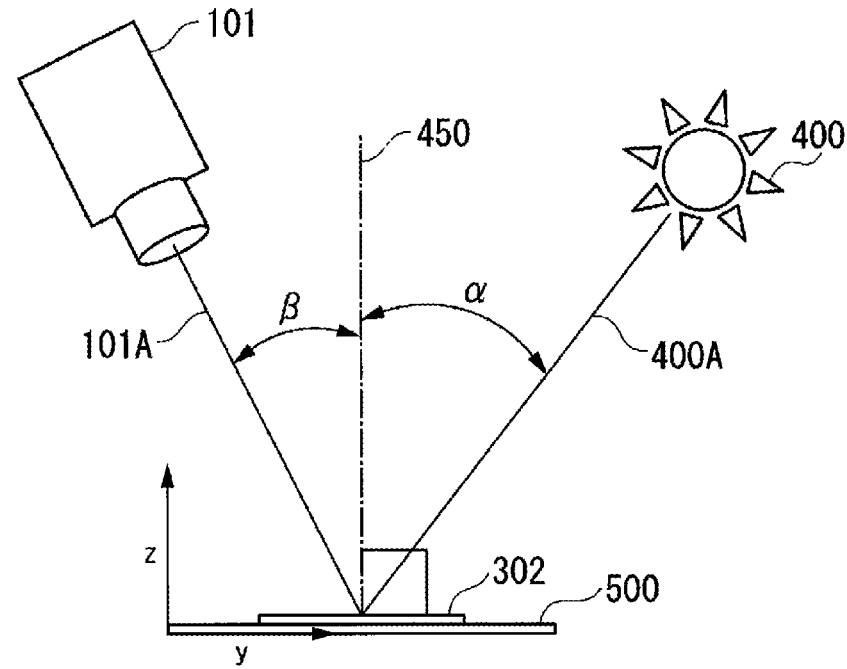
FIG. 6B is a diagram illustrating settings of a ± sign in an equation to obtain spectral distribution of diffracted light and the diagram illustrates the case where an imaging unit and a light source are located on opposite sides of an imaging object to each other.

FIGS. 6A and 6B are diagrams illustrating settings of a ± sign in the equation (1) to obtain the diffracted light spectral distribution. FIG. 6A illustrates the case where an observation direction of the imaging unit 101 and the irradiation direction of the light source 400 are in an identical direction not crossing the normal line 450. That is, FIG. 6A is the diagram illustrating the case where the imaging unit 101 and the light source 400 are located on one side in an imaging area of the color calibration hologram 302. In this case, a ± sign in the equation (1) above is set to + for calculation of the diffracted light wavelength λd. Meanwhile, FIG. 6B illustrates the case where the observation direction of the imaging unit 101 and the irradiation direction of the light source 400 are on opposite sides across the normal line 450. That is, FIG. 6B is the diagram illustrating the case where the imaging unit 101 and the light source 400 are located on opposite sides to each other across the imaging area of the color calibration hologram 302. In this case, ± in the equation (1) above is set as − for calculation of the diffracted light wavelength λd.

The diffracted light emitted from the color calibration hologram 302 has intensity calculated by multiplying intensity of the radiated light of the light source 400 at the diffracted light wavelength λd by diffraction efficiency of the color calibration hologram 302. The intensity of the radiated light of the light source 400 at the diffracted light wavelength λd means intensity of light with a wavelength (that is, λd) identical to the diffracted light wavelength λd in the spectral distribution of the light radiated by the light source 400.

The intensity of light with a wavelength in the spectral distribution is normalized in the entire possible range for the wavelength λd of the spectral distribution during the estimation of the spectral sensitivity. The intensity at the wavelength λd of the light source 400 thus does not have to be an absolute value and may be a relative value (that is, a ratio) to the maximum value in the spectral distribution of the light source 400.

Similarly, a phenomenon of a uniform decrease in the intensity in the entire spectral distribution of the radiated light from the light source 400 due to attenuation of light from a longer distance and the like does not have to be considered. The intensity of the diffracted light is thus readily calculated by obtaining the intensity of the radiated light in the spectral distribution of the light source 400 and the diffraction efficiency properties of the color calibration hologram 302.

As just described, the wavelength and the intensity of the diffracted light, which is light with a single wavelength emitted from the color calibration hologram 302 of the irradiating light source 400, are respectively calculated using the spatial frequency and the diffraction efficiency of the diffraction grating in the color calibration hologram 302, the light irradiation angle α of the light source 400, the observation angle β of the imaging unit 101, and the intensity of the radiated light at each frequency in the spectral distribution of the radiated light from the light source 400. This allows the diffracted light spectral distribution calculation unit 106, as described later, to calculate the diffracted light spectral distribution with a single wavelength emitted from the color calibration hologram 302 in correspondence with the radiated light.

Considering the size of the light source 400 and the lens of the imaging unit 101, when the diffracted light spectral distribution is actually measured, the diffracted light is measured as a spectral distribution with intensity in a conical shape in a narrow band near a specific wavelength.

Figures 7, 8:
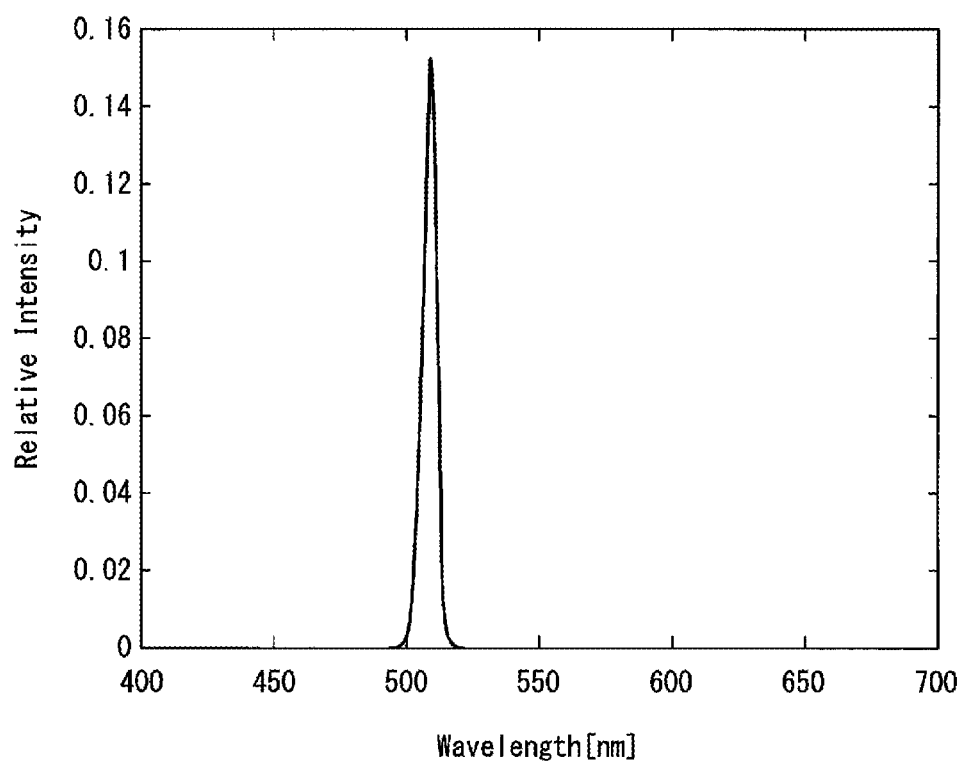
FIG. 7 is a diagram illustrating an example of spectral distribution of diffracted light with a single wavelength emitted from a color calibration hologram.
FIG. 8 is a chart illustrating an exemplary configuration of a captured image data table for spectral sensitivity estimation in the image data storage unit.

FIG. 7 is a diagram illustrating an example of the diffracted light spectral distribution with a single wavelength emitted from the color calibration hologram 302. In FIG. 7, the abscissa represents a wavelength of the diffracted light and the ordinate represents relative intensity of the diffracted light.

As illustrated in FIG. 7, the diffracted light is measured as diffracted light spectral distribution with intensity (relative intensity) in a conical shape in a narrow band near a specific wavelength. Such diffracted light spectral distribution may be used later for calculation to obtain the spectral sensitivity by being approximated as spectral distribution of light with a single wavelength. Calculation of the spectral sensitivity described later using the diffracted light spectral distribution with intensity in a conical shape does not markedly affect the calculation result of spectral sensitivity in a narrow band, allowing approximation as a single wavelength, that is, does not cause an error of a magnitude affecting accuracy of color calibration in comparison with the case of calculation actually using light with a single wavelength. For the reason described above, in the present embodiment, the diffracted light spectral distribution illustrated in FIG. 7 is used for color calibration as a spectral distribution with a single wavelength.

The order of the imaged diffracted light to obtain the diffracted light spectral distribution is desirably ±1 order, which has the greatest intensity of diffracted light. When ambient light and the like radiated from other than the light source 400 is incident to the hologram, the range where the zero-order and first-order diffracted light is observed is limited and diffracted light of ±2-order or greater has lower intensity. This makes it difficult for the diffracted light to be used, as color, for a signal value of each pixel in the image data. Accordingly, adjustment of the spatial frequency of the diffraction grating in the color calibration hologram 302 by considering the expected light irradiation angle α and the observation angle β of common imaging devices achieves a design less affected by ambient light.

Meanwhile, depending on the imaging conditions, such as imaging of the color calibration hologram 302 in a state where there is less influence of ambient light, even n-order (n≥2) diffracted light emitted from the color calibration hologram 302 is capable of being used for estimation of the diffracted light spectral distribution.

If the calculated wavelength of the diffracted light is in the range of visible light wavelengths, the diffracted light spectral distribution calculation unit 106 then associates the captured image data as captured image data capable of being used for the spectral sensitivity estimation process with the captured image data identification information to be associated respectively with the captured image data address and the diffracted light spectral distribution for writing and storage in the captured image data table for spectral sensitivity estimation of the image data storage unit 110.

FIG. 8 is a chart illustrating an exemplary configuration of the captured image data table for spectral sensitivity estimation in the image data storage unit 110. In FIG. 8, the captured image data identification information is information to identify each item of the captured image data similar to the captured image data table for calibration in FIG. 4. The captured image data addresses shown in FIG. 8 indicate the addresses of the areas in the image data storage unit 110 where the captured image data are stored, which constitute indexes for reading the captured image data from the image data storage unit 110. The diffracted light spectral distribution in FIG. 8 indicates a spectral wavelength of the diffracted light spectral distribution from the color calibration hologram 302 and intensity at the spectral wavelength in correspondence with the observation angle of imaging the captured image data indicated by the captured image data identification information. That is, in the captured image data table for spectral sensitivity estimation of the image data storage unit 110, a plurality of items of captured image data identification information, a plurality of captured image data addresses, and a plurality of items of information on diffracted light spectral distribution (a spectral wavelength and intensity at the spectral wavelength) are stored in association with each other.

Returning to FIG. 1, the camera sensitivity function estimation unit 107 estimates the spectral sensitivity of the imaging unit 101 using the diffracted light spectral distribution recorded in the image data storage unit 110 by the diffracted light spectral distribution calculation unit 106 and the captured image data corresponding to the diffracted light spectral distribution. A description is given below of the spectral sensitivity estimation process performed by the camera sensitivity function estimation unit 107.

In the estimation of spectral sensitivity, respective signal values of the color components of RGB obtained from the RAW data are defined as cR, cG, and cB. The spectral sensitivity of the imaging unit 101 in the respective wavelength bands of RGB is defined respectively as $SR(\lambda)$, $SG(\lambda)$, and $SB(\lambda)$ as functions of a light wavelength λ. When the diffracted light spectral distribution of the diffracted light incident to the imaging unit 101 is $L(\lambda)$ as a function of the light wavelength $\lambda$, an equation (2) below is established.

[Math. 2]

$$\begin{cases} c_R = \int S_R(\lambda)L(\lambda)d\lambda \\ c_G = \int S_G(\lambda)L(\lambda)d\lambda \\ c_B = \int S_B(\lambda)L(\lambda)d\lambda \end{cases} \quad (2)$$

In the equation (2), for example, the signal value cR is calculated by the camera sensitivity function estimation unit 107 as a result of integration of the function of multiplying the spectral sensitivity $S_R(\lambda)$ of the color component R of the imaging unit 101 in the optical system by the diffracted light spectral distribution in the wavelength band of the color component R (range of $\lambda$).

The respective other signal values cG and cB are also calculated by the camera sensitivity function estimation unit 107 in a similar manner to the signal value cR.

To allow the calculation process to be performed by a computer, the wavelength $\lambda$ in the equation (2) above is defined as discrete values with an interval of a predetermined increment. The discretization of the wavelength $\lambda$ allows expression of the equation (2) as an equation (3) by approximation where the respective functions $S_R(\lambda)$, $S_G(\lambda)$, and $S_B(\lambda)$ of the spectral sensitivity indicating the sensitivity of the color of the respective RGB color components are expressed as respective row vectors SR, SG, and SB and the function $L(\lambda)$ of the spectral distribution of the incident light is expressed as a column vector L.

[Math. 3]

$$\begin{pmatrix} c_R \\ c_G \\ c_B \end{pmatrix} = \begin{pmatrix} S_R \\ S_G \\ S_B \end{pmatrix} L \quad (3)$$

In estimation of the respective row vectors SR, SG, and SB of the spectral sensitivity, a predetermined number of respective combinations are obtained of the known column vector L of the spectral distribution of the incident light and the signal values cR, cG, and cB of the respective color components of RGB obtained from the RAW data when the incident light is imaged by the imaging unit 101. This predetermined number and the row vectors SR, SG, and SB (spectral sensitivity of the color components) are generally estimated by calculation such as, for example, multiplying both sides of the respective row vectors S R, S G, and S B by an inverse matrix of L from the right in the equation (3) above.

Meanwhile, as described earlier, the diffracted light incident from the color calibration hologram 302 in the present embodiment has a diffracted light spectral distribution in a narrow band allowing approximation with light with a single wavelength. That is, the diffracted light incident to the imaging unit 101 is light with a single wavelength and thus only single certain wavelength $\lambda i$ is the diffracted light spectral distribution with the same intensity of light. As a result, in the equation (3), in each component of the column vector L, a positive numerical value (the intensity of light) is expressed only by the component of the single wavelength $\lambda i$ corresponding to the wavelength of the diffracted light. In the column vector L, there is no wavelength $\lambda$ in the components other than the wavelength $\lambda i$ in the diffracted light spectral distribution and thus all the numerical values are 0.

In such a manner, only the component in the i th row of the column vector L is a positive numerical value, and thus in the equation (3), the right side is the product of the respective components SRi, SGi, and SBi in the i th column (corresponding to the wavelength $\lambda i$) of the respective row vectors S R, S G, and S B and the numerical value Li of the wavelength $\lambda i$ of the component in the i th row of the column vector L (a numerical value of the intensity of the diffracted light with the wavelength $\lambda i$), that is, a column vector in which SRi×Li, SGi×Li, and SBi×Li are aligned.

Accordingly, division of the numerical values of the respective signal values cR, cG, and cB in the row vectors at the wavelength $\lambda i$ by the numerical value Li allows the spectral sensitivity of the respective RGB components at the wavelength $\lambda i$ to be obtained. That is, division of the respective signal values cR, cG, and cB of the diffracted light inputted at the wavelength $\lambda i$ by the numerical value Li indicating the intensity of the diffracted light at the wavelength $\lambda i$ allows the spectral sensitivity of the respective RGB components at the wavelength $\lambda i$ to be obtained. In this situation, the respective spectral sensitivity SRi, SGi, and SBi at the wavelength $\lambda i$ are obtained respectively by cR/Li, cG/Li, and cB/Li.

Using the diffracted light with a predetermined number of various wavelengths thus obtained, the respective signal values cR, cG, and cB of the diffracted light at each wavelength $\lambda i$ of the diffracted light are divided by the numerical value Li of the intensity (may be referred to as the intensity Li) of the diffracted light at the wavelength $\lambda i$ to respectively obtain the spectral sensitivity SRi, SGi, and SBi as the discrete values at each wavelength $\lambda i$. With the spectral sensitivity SRi, SGi, and SBi as the discrete values being obtained for each predetermined interval (e.g., 4 nm), fitting of the function and the like are performed to obtain the signal value between the wavelengths $\lambda i$ by interpolation, and thus the respective functions $S_R(\lambda)$, $S_G(\lambda)$, and $S_B(\lambda)$ of the spectral sensitivity are estimated. In this situation, the intensity Li of the diffracted light is a numerical value calculated by multiplying the intensity of each wavelength $\lambda i$ in the spectral distribution of the radiated light from the light source by the diffraction efficiency (diffraction efficiency properties) of the color calibration hologram 302 at the wavelength $\lambda i$.

As described above, the camera sensitivity function estimation unit 107 refers to the captured image data table for spectral sensitivity estimation stored in the image data storage unit 110 to sequentially read the captured image data address and the diffracted light spectral distribution. The camera sensitivity function estimation unit 107 then reads the captured image data from the image data storage unit 110 using the captured image data address to obtain a pixel position where the color calibration hologram 302 is imaged in the captured image by the coordinate transformation equation.

The camera sensitivity function estimation unit 107 obtains signal values (e.g., equivalent to cR, cG, and cB in the equation (3)) of the respective color components of RGB from the pixel corresponding to the color calibration hologram 302.

The camera sensitivity function estimation unit 107 then sequentially divides, for each wavelength $\lambda i$ read from the captured image data table for spectral sensitivity estimation, the signal values of the respective color components of RGB at the wavelength λi by the intensity Li of the diffracted light at the wavelength λi in the diffracted light spectral distribution to obtain the spectral sensitivity of the respective color components of RGB. In other words, the camera sensitivity function estimation unit 107 obtains the spectral sensitivity of the diffracted light at a certain wavelength from the diffracted light spectral distribution of the diffracted light at the wavelength and the signal value in the captured image data of the diffracted light at the wavelength. When the process to obtain the spectral sensitivity of all the captured image data in the captured image data table for spectral sensitivity estimation is finished, the camera sensitivity function estimation unit 107 interpolates a signal value between the wavelengths λi and writes the respective spectral sensitivity functions SR(λ), SG(λ), and SB(λ) in the image data storage unit 110 for storage.

Using the spectral sensitivity of the imaging unit 101 estimated by the camera sensitivity function estimation unit 107, the color calibration unit 108 calibrates the color of the captured image data imaged by the imaging unit 101 to match the color of captured image data imaged by another standard imaging device. That is, the color calibration unit 108 calibrates difference in color of the captured image data imaged by the imaging unit 101 from that of captured image data imaged by a standard imaging device different from the imaging unit 101.

In the present embodiment, color calibration is defined as a color conversion process of captured image data P1 obtained by converting, only by demosaicing, the RAW data captured by the imaging unit 101 with spectral sensitivity S1 estimated by the camera sensitivity function estimation unit 107 into captured image data P2 obtained by converting, only by demosaicing, the RAW data captured by the imaging device with spectral sensitivity S2, which is different from the imaging unit 101 (e.g., standard), that is, color conversion from the signal value of the captured image data P1 to the signal value of the captured image data P2 where the spectral sensitivity S1 and the spectral sensitivity S2 are known. That is, the spectral sensitivity S1 is each of the spectral sensitivity functions SR(λ), SG(λ), and SB(λ) stored in the image data storage unit 110, and the spectral sensitivity S2 is a spectral sensitivity function for each of the color components of RGB in a standard imaging device. Such a spectral sensitivity function (spectral sensitivity S2) in a standard imaging device may be stored in an internal or external storage unit, not shown, of the color calibration device 1 or may be stored in the image data storage unit 110.

The color calibration described above to convert the captured image data P1 to the captured image data P2 is a process to estimate respective signal values of RGB in the case of being imaged by an imaging device with the spectral sensitivity S2 (the case of the captured image data P2) from respective signal values of RGB in the captured image data P1 of the subject imaged by the imaging unit 101 with the spectral sensitivity S1. For example, with regard to one identical pixel of a subject in the respective captured image data P1 and the captured image data P2, signal values of the respective color components of RGB in the single pixel are defined respectively as a signal value C1 and a signal value C2. When a single pixel of the subject has diffracted light spectral distribution of Ls, the signal value C1 and the signal value C2 are represented by an equation (4) below from the spectral sensitivity S1 and the spectral sensitivity S2. The signal value C1 and the signal value C2 are respective signal values of the respective color components of RGB.

[Math. 4]

$$\begin{cases} C_1 = S_1 L_s \\ C_2 = S_2 L_s \end{cases} \quad (4)$$

That is, in the equation (4), it is expressed that the signal value C1 is a numerical value obtained by multiplying light intensity Ls in the diffracted light spectral distribution by the spectral sensitivity S1 and the signal value C2 is a numerical value obtained by multiplying light intensity Ls in the spectral distribution by the spectral sensitivity S2.

As described earlier, the color conversion from the captured image data P1 to the captured image data P2 is equivalent to conversion of each signal value C1 of the RGB color components in all pixels of the captured image data respectively into the signal value C2.

For example, an equation (5) below is established by defining a pseudo-inverse matrix of the spectral sensitivity S1 as S1+ and by removing the light intensity Ls of the spectral distribution from the two equations in the equation (4) above.

[Math. 5]

$$C_2 = S_2 S_1^+ C_1 \quad (5)$$

As expressed in the equation (5) above, the relationship between the signal value C1 for each of the RGB color components in the captured image data P1 and the signal value C2 for each of the RGB color components in the captured image data P2 is represented by the respective known spectral sensitivity S1 and the spectral sensitivity S2, and the signal value C1 of the captured image data P1 is thus allowed to be converted into the signal value C2 of the captured image data P2. This facilitates color conversion in each pixel from the captured image data P1 to the captured image data P2.

The display unit 109 is, for example, a liquid crystal display and displays an image of the captured image data P1 thus imaged on its display screen, a graph indicating the spectral sensitivity functions thus estimated, or the like.

The image data storage unit 110 writes and stores the captured image data, the captured image data table for calibration, and the captured image data table for spectral sensitivity estimation as described above.

The imaging control unit 102 determines whether the observation angle in imaging of the color calibration hologram 302 is within a predetermined angular range. The angular range refers to a range of angles at which different diffracted light beams can be observed depending on a different observation angle in the color calibration hologram 302. If the observation angle is not in this angular range, the corresponding diffracted light is not allowed to be imaged and thus not to be used for spectral sensitivity estimation.

In this case, the imaging control unit 102 causes the observation angle estimation unit 105 to estimate an observation angle, which is an imaging direction of the imaging unit 101. The imaging control unit 102 displays information on the screen of the display unit 109 to indicate to the user that the angular condition in the imaging process is satisfied when the observation angle estimated by the observation angle estimation unit 105 is within the angular range, and that the angular condition in the imaging process is not satisfied when the estimated observation angle is not within the angular range to thereby prompt the user to adjust the observation angle of the imaging unit 101 to be within the angular range.

The imaging control unit 102 also determines whether imaging conditions are satisfied for obtaining captured image data with a quality capable of observation angle estimation and diffracted light color acquirement. As the imaging conditions, whether the focal length in the imaging unit 101 is the same as the focal length used for developing the coordinate transformation equation is detected. The imaging control unit 102 then displays an indication of satisfying the imaging conditions in the imaging process on the display screen of the display unit 109 if the currently set focal length is same as the focal length used for obtaining the coordinate transformation equation, whereas if the currently set focal length is different from the focal length used for developing the coordinate transformation equation, it displays an indication that the imaging conditions in the imaging process are not satisfied to prompt a user to adjust the focal length. The imaging conditions may include, if necessary, presence or absence of an illumination or intensity of the illumination as an exposure condition.

The imaging control unit 102 generates, as an imaging condition, a luminance histogram when setting the exposure condition of the imaging unit 101. The luminance histogram represents distribution of pixel values in the captured image data. With reference to this luminance histogram, the imaging control unit 102 then determines whether the distribution of pixel values in the captured image data is too far to the high pixel value side or the low pixel value side. For example, when the distribution of pixel values in the luminance histogram is too far to the low pixel value side, that is, when the pixel value is expressed in 256 levels of 0 to 255 and the captured image includes many pixels with a value around 0, the captured image data will have black crushing, and therefore the color of the diffracted light cannot be acquired. On the other hand, when the distribution of the pixel values in the luminance histogram is too far to the high pixel value side, that is, when the captured image data includes pixels with a value around 255, the captured image data will have some whiteout, and therefore the color of the diffracted light cannot be acquired.

Accordingly, it is necessary to set the exposure condition such that the distribution of the luminance histogram resides around the middle of the range 0 to 255.

The imaging control unit 102 determines whether the illuminator needs to be adjusted based on the distribution of the pixel values of the luminance histogram. When black crushing is expected to occur and the illuminator needs to be adjusted to shift the distribution of the luminance histogram to the high pixel value side, the imaging control unit 102 causes the exposure control unit 103 to illuminate the color calibration hologram 302 with light of a predetermined intensity from the illumination unit 104 during image capture (for example, irradiate the color calibration hologram 302 with flash light in the imaging direction). Further, when the color calibration device 1 does not include the exposure control unit 103 and the illumination unit 104, the imaging control unit 102 displays information on the screen of the display unit 109 prompting the user to illuminate the color calibration hologram 302 with light having sufficient intensity.

On the other hand, when halation is expected to occur and the illumination is required to be adjusted to shift the distribution of the luminance histogram toward the low pixel value side, the imaging control unit 102 controls the exposure control unit 103 so that the illumination unit 104 does not illuminate the color calibration hologram 302, or can illuminate the anti-counterfeiting medium 400 with a predetermined intensity during imaging. Further, the imaging control unit 102 displays information on the screen of the display unit 109 prompting the user to lower the intensity of current ambient illumination around the color calibration hologram 302 in order to provide illumination with the required light intensity to the color calibration hologram 302.

In the foregoing process, an exposure control table describing the distribution state of the luminance histogram and the exposure condition corresponding to the distribution state and the control conditions such as the intensity of the illuminator may be generated and written in advance in the image data storage unit 110. In this case, the imaging control unit 102 searches a luminance histogram similar to the luminance histogram pattern of the image data to be captured from the exposure control table in the image data storage unit 110, reads the information on the control condition such as the exposure condition and the illumination intensity of the image data to be captured, and displays the control condition on the screen of the display unit 109 as described above.

In addition, the exposure control unit 103 may be provided with an illuminance sensor so that the exposure condition and the illuminance of the illuminator can be set according to the illuminance measured by the illuminance sensor. In this case, an exposure control table describing the illuminance, the exposure condition corresponding to the illuminance, and the control conditions such as the intensity of the illuminator may be generated and written in advance in the image data storage unit 110. In this case, the imaging control unit 102 searches through the exposure control table in the image data storage unit 110, finding correlation with the illuminance in capturing the image data, to read the information on the control condition such as the exposure condition and the illumination intensity of the image data to be captured, and displays the control condition on the screen of the display unit 109 as described above.

Figure 9:
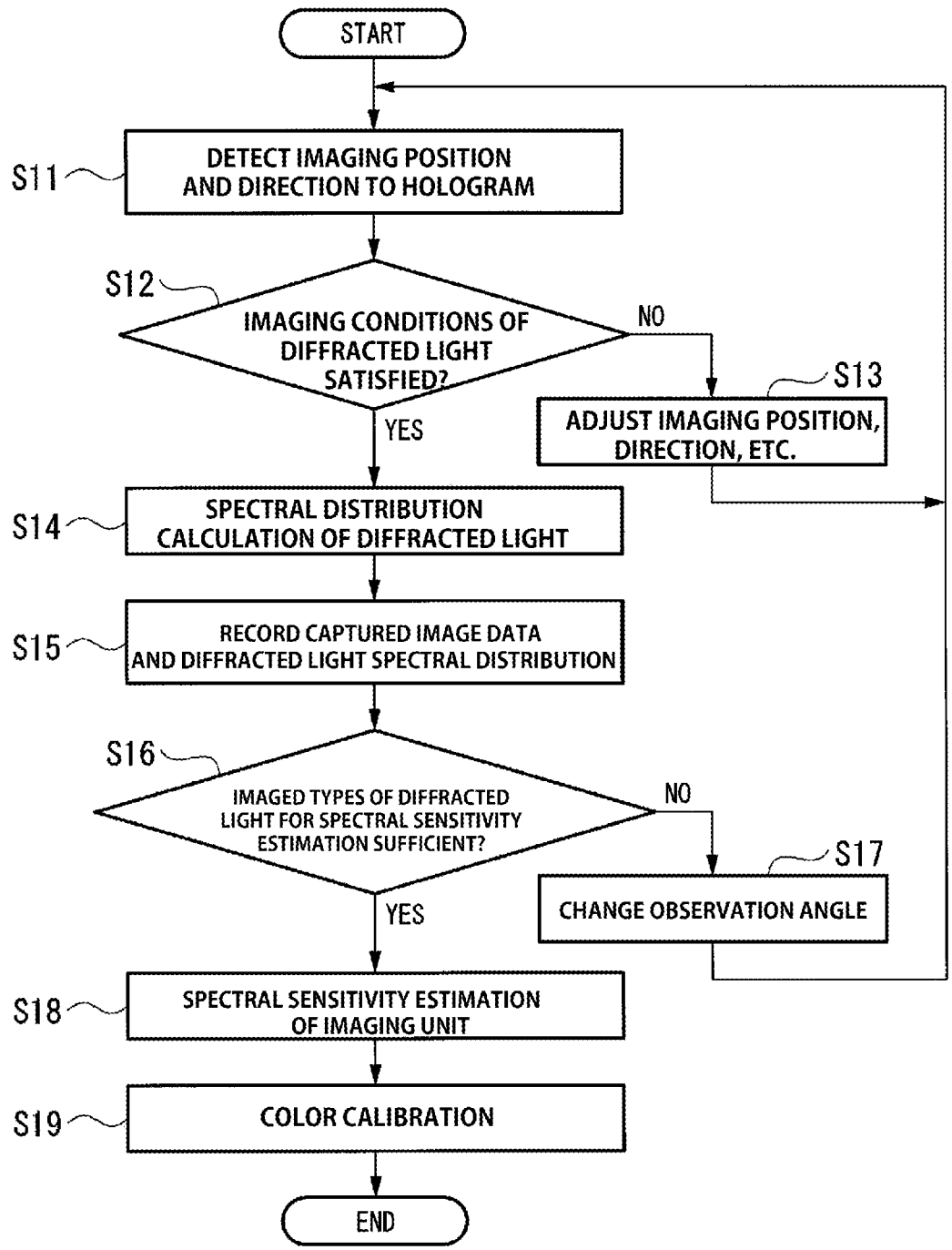
FIG. 9 is a flowchart illustrating an exemplary operation of color calibration of an imaging device using a hologram in a color calibration system of the first embodiment.

FIG. 9 is a flowchart illustrating an exemplary operation of color calibration of an imaging device using a hologram (the color calibration hologram 302) in the color calibration system of the first embodiment. When a user launches an application for color calibration on, for example, a personal computer, the functions of each unit in the color calibration system are executed in a main memory of the personal computer. The imaging unit 101 is then launched in a video mode to start imaging of an imaging object in an imaging direction.

The captured image data mentioned below represents an image per frame imaged by the imaging unit 101 as a video.

Step S11:

The imaging control unit 102 extracts an imaging position of the color calibration hologram 302 on the captured image data. That is, the imaging control unit 102 obtains a shape of the credit card 300 in the imaging range of the imaging unit 101. Then, the imaging control unit 102 compares the three-dimensional obtained shape of the credit card 300 with the prestored three-dimensional shape of the credit card 300 to extract the region of the color calibration hologram 302 in the imaging range of the imaging unit 101. In this situation, the imaging control unit 102 may display, together with the captured image in the imaging direction, an image frame to put the image of the credit card 300 therein on the display unit 109 to prompt a user to image the credit card 300 in a certain imaging position at a certain imaging angle.

The imaging control unit 102 causes the observation angle estimation unit 105 to perform the processing of estimating the imaging direction, i.e., the observation angle, of the color calibration hologram 302. Thus, the observation angle estimation unit 105 compares the three-dimensional shape of the credit card 300 obtained from the captured image data in the imaging range of the imaging unit 101 with the pre-stored three-dimensional shape of the credit card 300 in the three-dimensional coordinate system to estimate the observation position and the observation angle of the color calibration hologram 302. Here, the observation angle estimation unit 105 calculates the imaging position and the imaging direction in which the imaging unit 101 images the credit card 300 from the above comparison. Then, the observation angle estimation unit 105 calculates an angle formed between the normal line to the surface of the credit card 300 on which the color calibration hologram 302 is provided and the imaging direction of the imaging unit 101, in the three-dimensional coordinate system, as the observation angle, and outputs the angle, together with the observation position to the imaging control unit 102.

Step S12:

The imaging control unit 102 determines whether the observation position and the observation angle of the hologram by the imaging unit 101 inputted from the observation angle estimation unit 105 are in respective ranges of a set observation position and a set observation angle that are set in advance.

If the observation position and the observation angle of the color calibration hologram 302 by the imaging unit 101 are in the respective ranges of the set observation position and the set observation angle set in advance, the imaging control unit 102 advances the process to step S14.

Meanwhile, if the observation position and the observation angle of the color calibration hologram 302 by the imaging unit 101 are not in the respective ranges of the set observation position and the set observation angle set in advance, the imaging control unit 102 advances the process to step S13.

The imaging control unit 102 may determine, in addition to the determination of the set observation position and the set observation angle, whether all imaging conditions, such as the focal length and the exposure conditions, are conditions allowing imaging of the captured image data and capable of acquisition of the diffracted light color. When determining that the imaging conditions allow imaging of the captured image data capable of obtaining the diffracted light color, the imaging control unit 102 advances the process to step S14. On the other hand, when determining that the imaging conditions do not allow imaging of the captured image data such that the diffracted light color can be obtained, the imaging control unit 102 advances the process to step S13.

Step S13:

The imaging control unit 102 displays that the observation position and the observation angle do not satisfy the conditions to image the diffracted light on the display unit 109 to prompt a user for adjustment. The user adjusts the imaging direction and the position of the imaging unit 101 in accordance with the instruction displayed on the display unit 109. The imaging control unit 102 may display an adjustment of the imaging conditions, such as the focal length and the exposure conditions of the imaging unit 101, on the display unit 109 if necessary. In this case, the user adjusts the imaging conditions, such as the focal length and the exposure conditions, of the imaging unit 101, in accordance with the displayed instruction.

Step S14:

The diffracted light spectral distribution calculation unit 106 calculates the diffracted light spectral distribution from the spectral distribution of light radiated from the light source 400 given in advance, diffracted light properties, such as the spatial frequency and the diffraction efficiency of the color calibration hologram 302 similarly given in advance, the observation angle, and the observation position.

Step S15:

The diffracted light spectral distribution calculation unit 106 writes the captured image data during imaging by the imaging unit 101 into a predetermined region of the image data storage unit 110 for storage. The diffracted light spectral distribution calculation unit 106 also writes a captured image data address as the address of the region where the captured image data is written in the image data storage unit 110 and the diffracted light spectral distribution in the captured image data table for estimating spectral sensitivity of the image data storage unit 110 for storage.

Step S16:

The imaging control unit 102 determines whether the number of types of the diffracted light spectral distribution stored in the captured image table for spectral sensitivity estimation of the image data storage unit 110 is sufficient for spectral sensitivity estimation. Determination as to whether the number of types of the diffracted light spectral distribution is sufficient for spectral sensitivity estimation may be made based on the number of wavelength types stored in the captured image data table for estimating spectral sensitivity or may be whether all of the diffracted light spectral distribution has been obtained at wavelengths set in advance required for spectral sensitivity estimation. For example, the imaging control unit 102 determines whether a diffracted light spectral distribution sufficient for estimation of the spectral sensitivity has been acquired for all data for 100 wavelengths K discretized with an interval of 4 nm each in wavelength band from 380 nm to 780 nm in the visible wavelength range.

If the number of types of the diffracted light spectral distribution stored in the captured image table for spectral sensitivity estimation is sufficient for estimation of the spectral sensitivity, the imaging control unit 102 then advances the process to step S18.

Meanwhile, if the number of types of the diffracted light spectral distribution stored in the captured image data table for estimating spectral sensitivity is not sufficient number for estimation of the spectral sensitivity, the imaging control unit 102 advances the process to step S17.

Step S17:

The imaging control unit 102 performs process of imaging the diffracted light different from the diffracted light spectral distribution stored in the captured image data table for estimating spectral sensitivity. That is, the imaging control unit 102 displays instruction to change the observation angle on the display unit 109 to prompt a user to change the observation angle for imaging the credit card 300. The imaging control unit 102 then advances the process to step S11.

Step S18:

The camera sensitivity function estimation unit 107 reads all the captured image data addresses and the diffracted light spectral distribution stored in the captured image data table for estimating spectral sensitivity of the image data storage unit 110. The camera sensitivity function estimation unit 107 also reads the captured image data from the image data storage unit 110 using the captured image data address.

The camera sensitivity function estimation unit 107 then extracts a pixel position of the color calibration hologram 302 in the captured image data read from the image data storage unit 110 using the coordinate transformation equation. The camera sensitivity function estimation unit 107 acquires the signal values of the respective RGB color components of the diffracted light from pixels in the color calibration hologram 302 and estimates the spectral sensitivity of the imaging unit 101 in combination with the diffracted light spectral distribution of respectively corresponding wavelengths.

Step S19:

The color calibration unit 108 performs color calibration of the captured image data P1 imaged by the imaging unit 101 to match the color of the captured image data P2 imaged by a standard imaging device based on the spectral sensitivity of the imaging unit 101 estimated by the camera sensitivity function estimation unit 107.

An authentication determination unit, not shown, then reads a reference pattern of the diffracted light (a true pattern of diffracted light) in capturing the imaging object (authentication determination hologram 301) with the standard imaging device from the image data storage unit 110 in correspondence with the observation angle in capturing the captured image data.

The authentication determination unit also performs color calibration of the respective RGB color components of in a pixel region of the authentication determination hologram 301 in the captured image data using the already described spectral sensitivity estimated by the camera sensitivity function estimation unit 107. The authentication determination unit compares similarity between the pattern of the diffracted light in the captured image data subjected to the color calibration and the reference pattern thus read out and makes a determination as true if the similarity is a predetermined threshold or more while it makes a determination as false if the similarity is less than the predetermined threshold. The reference pattern is formed by color imaged by a standard imaging device.

According to the configuration described above, the present embodiment is capable of generating a profile of hardware properties for color correction between imaging devices (a spectral sensitivity function) without being affected by ambient light in the environment, different from the case of using a color chart, such as a Macbeth color chart. The present embodiment is thus capable of converting the color of the diffracted light of the authentication determination hologram 301 provided as an anti-counterfeiting medium on the surface of the credit card 300 into color as imaged by a standard imaging device, not being affected by the properties of the optical system in the imaging unit 101, and thus is capable of improving the accuracy of the authentication determination of the credit card 300.

General reflective holograms include a rainbow hologram reflecting diffracted light by a metal foil and a Lippmann hologram reflecting by the diffraction of the hologram itself. A full color hologram develops color by diffraction of light incident to the diffraction grating on the surface, and thus can emit light with a certain spectral distribution having a narrow band. Accordingly, depending on design, the reflected light is allowed to be adjusted at the wavelength distribution level to express arbitrary color (diffracted light spectral distribution of each of the RGB color components) (e.g., refer to JP 8-261827 A, JP 8-500192 A, and JP 3-280078 A).

The present embodiment is also capable of acquiring diffracted light for each of the authentication determination hologram 301 and the color calibration hologram 302 by capturing the credit card 300 as a video using the imaging unit 101. Accordingly, no special user action is needed for the color calibration device 1 to obtain the spectral sensitivity for color calibration using the color calibration hologram 302. The color calibration device 1 then calibrates the captured image data of the diffracted light of the authentication determination hologram 301 to color as imaged by a standard imaging device based on the spectral sensitivity thus obtained. The authentication determination unit then compares the calibrated captured image data of the diffracted light of the authentication determination hologram 301 with the reference pattern of the diffracted light imaged by a standard imaging device at an identical observation angle for authentication determination using the similarity, allowing highly accurate authentication determination.

The present embodiment is also capable of controlling the diffraction direction of the pattern of the diffracted light, that is, the observation angle, using the spatial frequency of the hologram to avoid influence from ambient light. The present embodiment is further capable of correctly estimating the spectral sensitivity from the properties of the optical system including the imaging element of the imaging unit 101 because the diffracted light of such a hologram is light with a single wavelength.

A general color chart, such as a Macbeth color chart, is affected by all light sources including ambient light because the surface has diffuse reflection properties. Accordingly, the manner of exposing each color chip to light had to be taken care of, not changing it using a cover or the like in the past. Moreover, due to the metamerism phenomenon occurring depending on the spectral distribution of the light source, a large number, for example 24 types, of color chips with various spectral reflectances had to be aligned in parallel to correctly determine the color properties of a camera, causing an increase in size. Furthermore, powder coating to avoid mirror reflection is prone to become dirty.

The present embodiment may be, however, provided with a protective film on the hologram as the imaging object and is more dirt resistant in comparison with the Macbeth color chart and is also capable of acquiring diffracted light of various colors in one region composed of a diffraction grating, allowing reduction in size.

The present embodiment has described the example configuration of forming the authentication determination hologram 301 and the color calibration hologram 302 respectively as independent holograms to the credit card 300.

However, one hologram may be configured as a color calibration and authentication determination hologram emitting each of the pattern of the diffracted light used for color calibration and the pattern of the diffracted light used for authentication determination. That is, an observation angular range in which the pattern of the diffracted light is emitted is set in advance in each of the angular range of a diffracted light pattern for color calibration and the angular range of a diffracted light pattern for authentication determination. The captured image data is thus imaged within the observation angular range in the color calibration and authentication determination hologram, and thus the pattern of the diffracted light to obtain the spectral sensitivity used for color calibration and the pattern of the diffracted light used for authentication determination are obtained at the same time.

Second Embodiment

A second embodiment of the present invention will be described with reference to the drawings.

Figure 10:
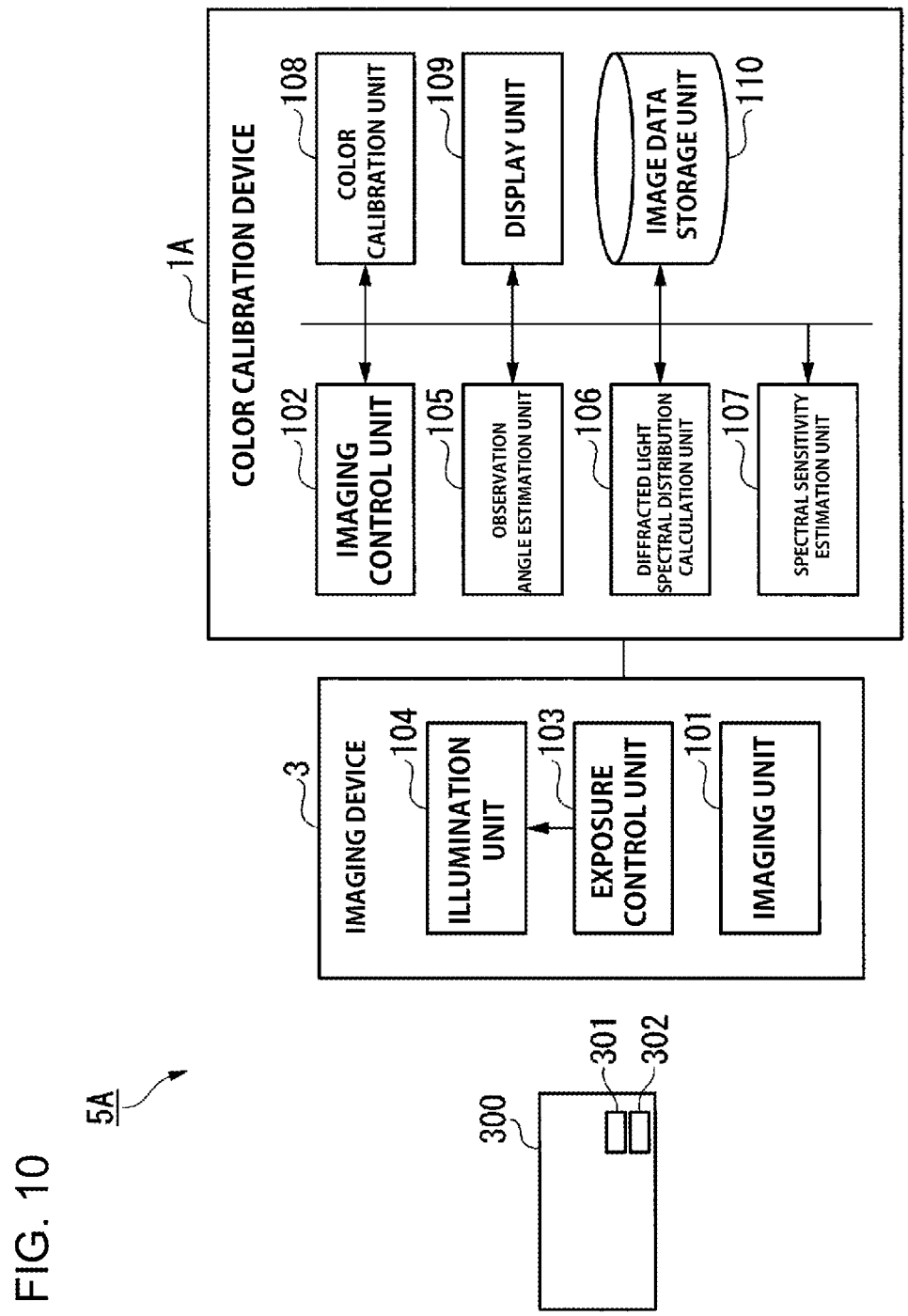
FIG. 10 is a block diagram illustrating an exemplary configuration of a color calibration system provided with a color calibration device in a second embodiment.

FIG. 10 is a block diagram illustrating an exemplary configuration of a color calibration system in the second embodiment. In FIG. 10, a color calibration system 5A is provided with a color calibration device 1A and an imaging device 3. The color calibration device 1A is provided with the imaging control unit 102, the observation angle estimation unit 105, the diffracted light spectral distribution calculation unit 106, the camera sensitivity function estimation unit 107, the color calibration unit 108, the display unit 109, and the image data storage unit 110. The imaging device 3 is also provided with the imaging unit 101, the exposure control unit 103, and the illumination unit 104. In the present embodiment, the color calibration system 5A is configured with the color calibration device 1A and the color calibration hologram 302. In FIG. 10, the same elements as those of the first embodiment are denoted by the same reference characters.

In the present embodiment, the color calibration system 5A is configured to have the imaging device 3 for the functions of imaging and light exposure in the first embodiment separated from the color calibration device 1A. This allows an imaging device as a color calibration object, such as a general purpose digital camera or a mobile terminal (including a mobile phone and a smartphone), to be controlled from an externally connected device and also allows handling of a plurality of imaging devices.

The color calibration device 1A may have a cloud configuration, although not shown, to allow communication with a digital camera or a mobile terminal using an information communication circuit, such as the internet. The color calibration device 1A may be configured to perform the process of color calibration of the imaging device by using the captured image data supplied from a digital camera or a mobile terminal as with the aforementioned first embodiment.

The second embodiment is also capable of obtaining actions and effects similar to those in the first embodiment described above.

Third Embodiment

Figure 11:
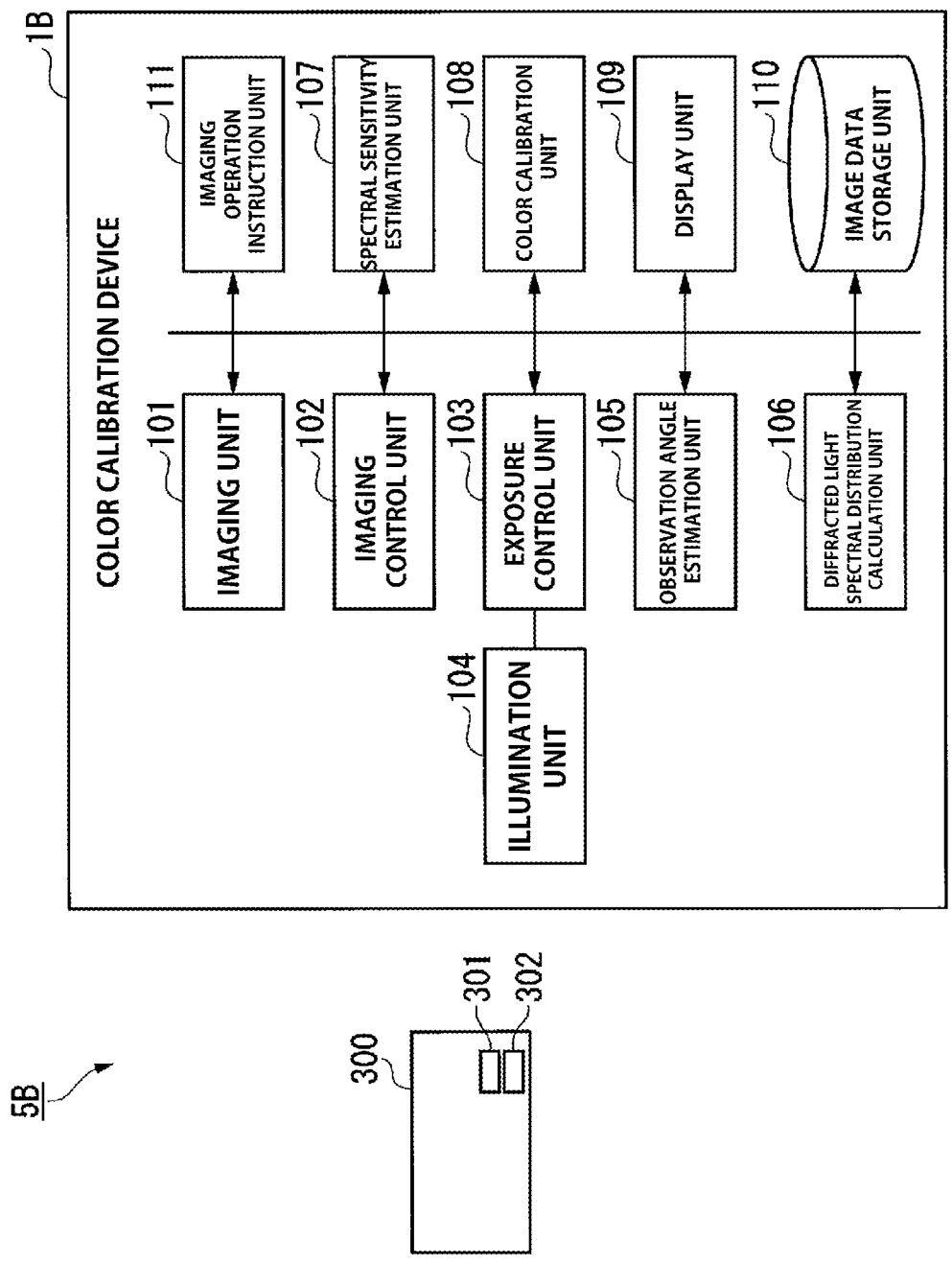
FIG. 11 is a block diagram illustrating an exemplary configuration of a color calibration system provided with a color calibration device in a third embodiment.

A third embodiment of the present invention will be described with reference to the drawings. In the description of the present embodiment, an identical reference sign is given to the component same as that in the first embodiment to omit the description. FIG. 11 is a block diagram illustrating an exemplary configuration of a color calibration system provided with a color calibration device in the third embodiment. In FIG. 11, a color calibration device 1B is provided with the imaging unit 101, the imaging control unit 102, the exposure control unit 103, the illumination unit 104, the observation angle estimation unit 105, the diffracted light spectral distribution calculation unit 106, an imaging operation instruction unit 111, the camera sensitivity function estimation unit 107, the color calibration unit 108, the display unit 109, and the image data storage unit 110. A color calibration system 5B is configured with the color calibration device 1B and the color calibration hologram 302.

As illustrated in FIG. 11, the imaging operation instruction unit 111 uses all the spectral wavelengths of the diffracted light spectral distribution (may be referred to simply as diffracted light spectral distribution) stored in the image data storage unit 110 by the diffracted light spectral distribution calculation unit 106 and determines whether they are sufficient for estimation of the spectral sensitivity of the imaging unit 101. That is, the imaging operation instruction unit 111 determines whether all the diffracted light spectral distribution has been acquired respectively corresponding to a plurality of items of required diffracted light spectral distribution set in advance that are necessary for spectral sensitivity estimation with required accuracy.

Figure 12:
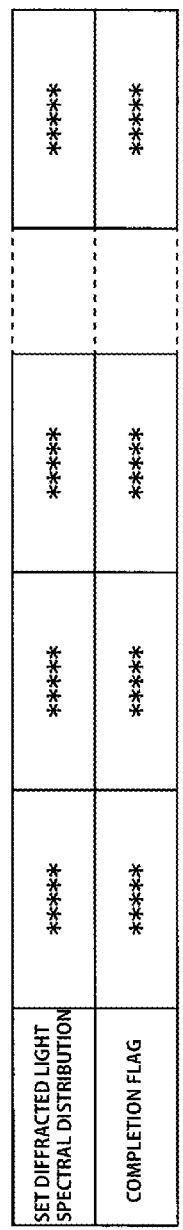
FIG. 12 is a chart illustrating an exemplary configuration of a diffracted light spectral distribution acquirement completion table stored in an image data storage unit.

FIG. 12 is a chart illustrating an exemplary configuration of a diffracted light spectral distribution acquirement completion table stored in the image data storage unit 110.

The diffracted light spectral distribution acquirement completion table illustrated in FIG. 12 is provided with a field for the required diffracted light spectral distribution and a field for a completion flag corresponding to the required diffracted light spectral distribution. In the required diffracted light spectral distribution, spectral wavelengths of the required diffracted light spectral distribution in a period necessary for spectral sensitivity estimation with required accuracy are described. For example, the required diffracted light spectral distribution is set as spectral wavelengths of 380 nm, 390 nm, . . . , 770 nm, 780 nm obtained by dividing from 380 nm to 780 nm by a wavelength period of 10 nm. The completion flag is a flag to be written in the field corresponding to, when a spectral wavelength of the diffracted light spectral distribution that matches a spectral wavelength in the required diffracted light spectral distribution is acquired from the captured image, the spectral wavelength in the required diffracted light spectral distribution thus acquired. For example, the completion flag is 1 if acquired and is 0 if not acquired. In this situation, in the diffracted light spectral distribution acquirement completion table all completion flags are initially 0.

Returning to FIG. 11, the imaging operation instruction unit 111 refers to the diffracted light spectral distribution in the captured image data table for spectral sensitivity estimation of the image data storage unit 110 to detect whether the diffracted light spectral distribution corresponding to the required diffracted light spectral distribution in the diffracted light spectral distribution acquirement completion table has been acquired (that is, to detect whether the diffracted light spectral distribution of the spectral wavelength corresponding to the spectral wavelength in the required diffracted light spectral distribution is stored in the captured image data table for spectral sensitivity estimation).

When detecting that the diffracted light spectral distribution of the spectral wavelength corresponding to the spectral wavelength in the required diffracted light spectral distribution has been acquired, the imaging operation instruction unit 111 sets a completion flag in the field for a completion flag corresponding to the spectral wavelength of the required diffracted light spectral distribution in the diffracted light spectral distribution acquirement completion table, that is, updates the flag from 0 to 1.

The imaging operation instruction unit 111 determines whether the spectral wavelength of the required diffracted light spectral distribution coincides with the spectral wavelength of the diffracted light spectral distribution by determining whether the spectral wavelength of the diffracted light spectral distribution is within an error range centered on the spectral wavelength of the required diffracted light spectral distribution, for example, 390 nm±2 nm. In this situation, when the spectral wavelength of the diffracted light spectral distribution is within the error range centered on the spectral wavelength of the required diffracted light spectral distribution, the imaging operation instruction unit 111 determines that the spectral wavelength of the required diffracted light spectral distribution coincides with the spectral wavelength of the diffracted light spectral distribution. Meanwhile, when the spectral wavelength of the diffracted light spectral distribution is not within the error range centered on the spectral wavelength of the required diffracted light spectral distribution, the imaging operation instruction unit 111 determines that the spectral wavelength of the required diffracted light spectral distribution does not coincide with the spectral wavelength of the diffracted light spectral distribution. The imaging operation instruction unit 111 determines whether estimating the spectral sensitivity can be estimated based on whether all completion flags in the diffracted light spectral distribution acquirement completion table are set to 1. When determining that estimating the spectral sensitivity is not possible, the imaging operation instruction unit 111 then displays a notification to prompt acquisition of the spectral wavelength not yet acquired of the diffracted light spectral distribution on the display unit 109.

Figure 13:
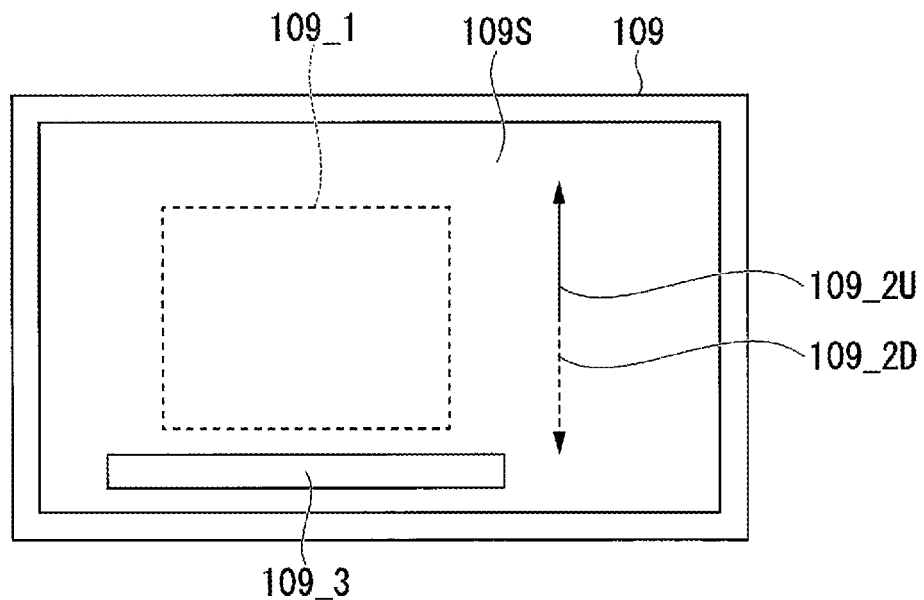
FIG. 13 is a diagram illustrating an example of a notification, displayed on a display screen of a display unit by an imaging operation instruction unit, to prompt acquisition of a diffracted light spectral distribution.

FIG. 13 is a diagram illustrating an example of a notification to prompt acquisition of diffracted light spectral distribution displayed on the display screen of the display unit 109 by the imaging operation instruction unit 111. In FIG. 13, an image frame 109_1 to place the image of the credit card 300 therein is displayed on a display screen 109S of the display unit 109 by the imaging operation instruction unit 111. In addition, on the display screen 109S, arrows 109_2U and 109_2D are respectively displayed to move the imaging direction of the captured image. For example, in the required acquisition range of the diffracted light spectral distribution, when acquisition of diffracted light spectral distribution in an observation angular range at a smaller angle is insufficient relative to the observation angle corresponding to the current imaging direction, a guiding display to blink the arrow 109_2U is performed to move the current imaging direction (observation position) upward (in a direction away from the credit card 300). Meanwhile, when acquisition of diffracted light spectral distribution in an observation angular range at a greater angle is insufficient relative to the observation angle corresponding to the current imaging direction, a guiding display to blink the arrow 109_2D is performed to move the imaging direction of the captured image (observation position) downward (in a direction approaching the credit card 300).

In this situation, the imaging operation instruction unit 111 extracts diffracted light spectral distribution that is not yet acquired from the diffracted light spectral distribution acquisition completion table and obtains the observation angle corresponding to the diffracted light spectral distribution for determination whether diffracted light spectral distribution on a greater side or a smaller side from the current observation angle is required.

When, for example, the diffracted light spectral distribution is not allowed to be acquired in a necessary wavelength period due to a fast rate of change in the observation angle for imaging a captured image, an image of a character string, such as "Slowly change the imaging direction and capture again." is displayed by the imaging operation instruction unit 111 to prompt a user to slow down the rate of change in the observation angle for imaging the captured image.

Figure 14:
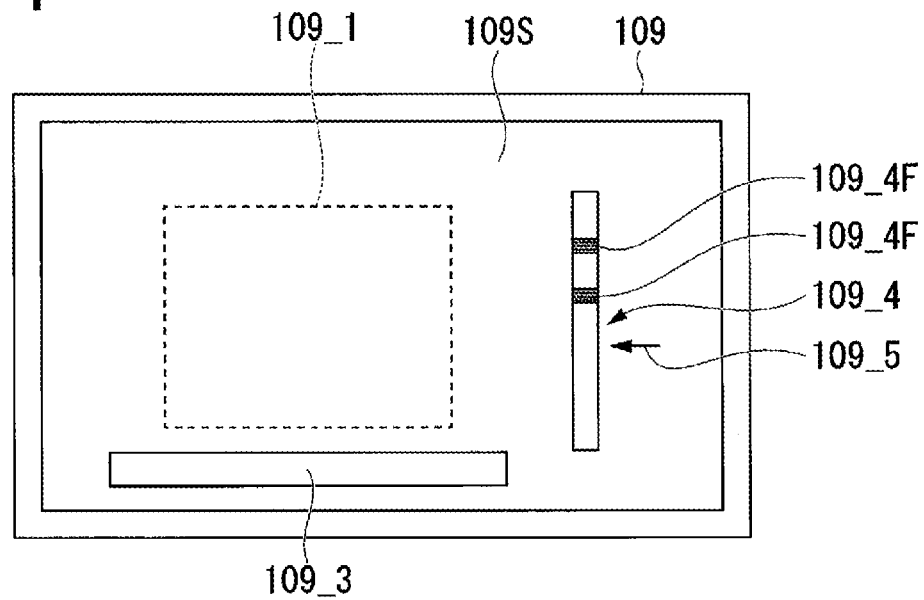
FIG. 14 is a diagram illustrating another example of a notification, displayed on the display screen of the display unit by the imaging operation instruction unit, to prompt acquirement of a diffracted light spectral distribution.

FIG. 14 is a diagram illustrating another example of a notification to prompt acquisition of diffracted light spectral distribution, displayed on the display screen of the display unit 109 by the imaging operation instruction unit 111. In FIG. 14, similar to FIG. 13, the image frame 109_1 to place the image of the credit card 300 therein is displayed on the display screen 109S of the display unit 109 by the imaging operation instruction unit 111. In the display region 109_3, similar to FIG. 13, an image to prompt capturing of the captured image again is displayed. An acquired observation angle confirmation region 109_4 represents an observation angle corresponding to the acquired spectral wavelength of the diffracted light spectral distribution and an observation angle corresponding to the spectral wavelength not yet acquired of the diffracted light spectral distribution. In FIG. 14, for example, in an observation angular range corresponding to the spectral wavelength of the diffracted light spectral distribution having to be acquired, positions indicating the observation angles corresponding to the spectral wavelengths not yet acquired of the diffracted light spectral distribution are illustrated as failure regions 109_4F by a blinking display.

In this situation, the imaging operation instruction unit 111 extracts the spectral wavelengths not yet acquired of the diffracted light spectral distribution from the diffracted light spectral distribution acquisition completion table and obtains the observation angle corresponding to the spectral wavelengths of the diffracted light spectral distribution. The imaging operation instruction unit 111 then displays the positions, by blinking, corresponding to the observation angle of the spectral wavelengths not yet acquired of the diffracted light spectral distribution obtained in the display region 109_3 on the display screen 109S for display as the failure regions 109_4F.

In this situation, in correspondence with the acquired observation angle confirmation region 109_4, an arrow 109_5 indicating the current observation angle, that is, the imaging direction of the captured image is displayed. This allows a user to confirm in what direction, relative to the current imaging direction, the observation angle corresponding to the spectral wavelength of the diffracted light spectral distribution to be acquired is left. In this situation, in the display region 109_3 for example, an image of a character string, such as "Slowly change the imaging direction along the blinking area displayed by the arrow until stop blinking and capture again." to prompt a user to capture the captured image again is displayed by the imaging operation instruction unit 111.

In the above configuration, the area in the failure regions 109_4F may be displayed, not by blinking, but in color different from the other areas in the acquired observation angle confirmation region 109_4. For example, the failure regions 109_4F are displayed in red and the other areas (the areas of the observation angle of the acquired spectral wavelength of the diffracted light spectral distribution) in the acquired observation angle confirmation region 109_4 in green. In this situation, for example, an image of a character string as "Slowly change the imaging direction along the areas in red displayed by the arrow until all changes to green and capture again." to prompt a user to capture the captured image again is displayed by the imaging operation instruction unit 111.

When an acquirement signal indicating all the diffracted light spectral distribution having to be acquired is supplied (inputted) from the imaging operation instruction unit 111, the camera sensitivity function estimation unit 107 estimates the spectral sensitivity of the imaging unit 101 using the diffracted light spectral distribution recorded in the image data storage unit 110 by the diffracted light spectral distribution calculation unit 106 and the captured image data corresponding to the diffracted light spectral sensitivity.

Figure 15:
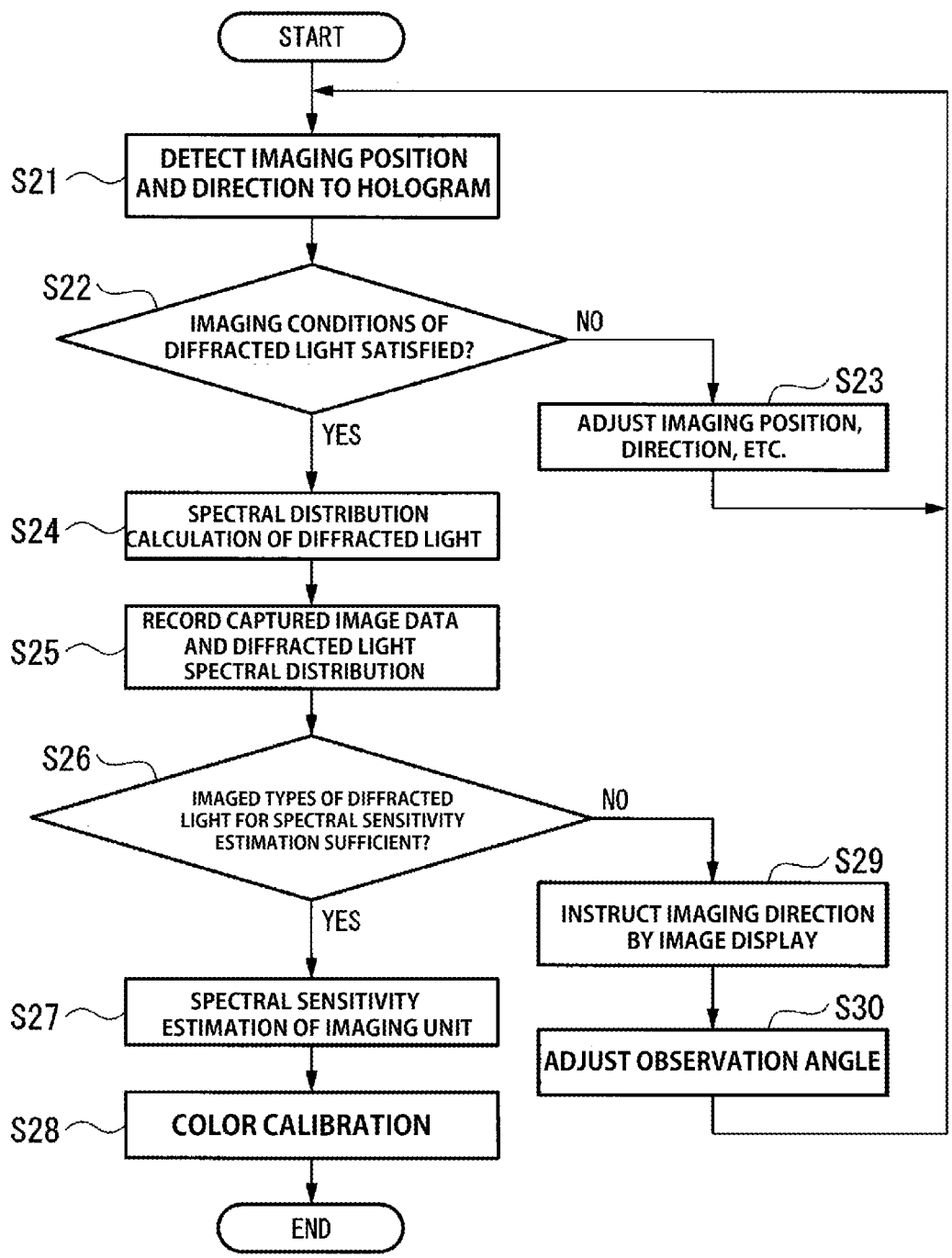
FIG. 15 is a flowchart illustrating an exemplary operation of color calibration of an imaging device using a hologram in a color calibration system of the third embodiment.

FIG. 15 is a flowchart illustrating an exemplary operation of color calibration of an imaging device using a hologram (the color calibration hologram 302) in the color calibration system of the third embodiment. When a user launches an application for color calibration on, for example, a personal computer, the functions of each unit in the color calibration system are executed in a main memory of the personal computer.

The imaging unit 101 is then launched in a video mode to start imaging of an imaging object in an imaging direction.

The captured image data mentioned below represents an image per frame imaged by the imaging unit 101 as a video.

Step S21:

The imaging control unit 102 extracts an imaging position of the color calibration hologram 302 on the captured image data. That is, the imaging control unit 102 obtains a shape of the credit card 300 in the imaging range of the imaging unit 101. Then, the imaging control unit 102 compares the three-dimensional obtained shape of the credit card 300 with the prestored three-dimensional shape of the credit card 300 to extract the region of the color calibration hologram 302 in the imaging range of the imaging unit 101. In this situation, the imaging control unit 102 may display, together with the captured image in the imaging direction, an image frame to position the image of the credit card 300 therein on the display unit 109 to prompt a user to image the credit card 300 from a certain imaging position at a certain imaging angle.

The imaging control unit 102 causes the observation angle estimation unit 105 to perform the processing of estimating the imaging direction, i.e., the observation angle, of the color calibration hologram 302. Thus, the observation angle estimation unit 105 compares the three-dimensional shape of the credit card 300 obtained from the captured image data in the imaging range of the imaging unit 101 with the pre-stored three-dimensional shape of the credit card 300 in the three-dimensional coordinate system to estimate the observation position and the observation angle of the color calibration hologram 302. Here, the observation angle estimation unit 105 calculates the imaging position and the imaging direction in which the imaging unit 101 images the credit card 300 from the above comparison. Then, the observation angle estimation unit 105 calculates an angle formed between the normal line to the surface of the credit card 300 on which the color calibration hologram 302 is provided and the imaging direction of the imaging unit 101, in the three-dimensional coordinate system, as the observation angle, and outputs the angle, together with the observation position to the imaging control unit 102.

Step S22:

The imaging control unit 102 determines whether the observation position and the observation angle of the hologram by the imaging unit 101 inputted from the observation angle estimation unit 105 are in respective ranges of a set observation position and a set observation angle that are set in advance.

If the observation position and the observation angle of the color calibration hologram 302 by the imaging unit 101 are in the respective ranges of the set observation position and the set observation angle set in advance, the imaging control unit 102 advances the process to step S24.

Meanwhile, if the observation position and the observation angle of the color calibration hologram 302 by the imaging unit 101 are not in the respective ranges of the set observation position and the set observation angle set in advance, the imaging control unit 102 advances the process to step S23.

The imaging control unit 102 may determine, in addition to the determination of the set observation position and the set observation angle, whether all imaging conditions, such as the focal length and the exposure conditions, are conditions allowing imaging of the captured image data and capable of acquisition of the diffracted light color. When determining that the imaging conditions allow imaging of the captured image data capable of obtainment of the diffracted light color, the imaging control unit 102 advances the process to step S24. On the other hand, when determining that the imaging conditions do not allow the imaging of the captured image data capable of obtaining the diffracted light color, the imaging control unit 102 advances the process to step S23.

Step S23:

The imaging control unit 102 displays that the observation position and the observation angle do not satisfy the conditions to image the diffracted light on the display unit 109 to prompt a user for adjustment. The user adjusts the imaging direction and the position of the imaging unit 101 in accordance with the instruction displayed on the display unit 109. The imaging control unit 102 may display an adjustment of the imaging conditions, such as the focal length and the exposure conditions of the imaging unit 101, on the display unit 109 if necessary. In this case, the user adjusts the imaging conditions, such as the focal length and the exposure conditions, of the imaging unit 101 in accordance with the displayed instruction.

Step S24:

The diffracted light spectral distribution calculation unit 106 calculates the diffracted light spectral distribution from the spectral distribution of light radiated from the light source 400 given in advance, diffracted light properties, such as the spatial frequency and the diffraction efficiency of the color calibration hologram 302 similarly given in advance, the observation angle, and the observation position.

Step S25:

The diffracted light spectral distribution calculation unit 106 writes the captured image data during imaging by the imaging unit 101 into a predetermined region of the image data storage unit 110 for storage. The diffracted light spectral distribution calculation unit 106 also writes a captured image data address as the address of the region where the captured image data is written in the image data storage unit 110 and the diffracted light spectral distribution in the captured image data table for estimating spectral sensitivity of the image data storage unit 110 for storage.

The imaging operation instruction unit 111 refers to the captured image data table for estimating spectral sensitivity in the image data storage unit 110 and extracts the acquired spectral wavelength of the diffracted light spectral distribution. The imaging operation instruction unit 111 then refers to the diffracted light spectral distribution acquirement completion table in the image data storage unit 110, detects the spectral wavelength of the required diffracted light spectral distribution that matches the extracted spectral wavelength of the diffracted light spectral distribution and sets a flag in the completion flag field (that is, changes from "0" to "1").

Step S26:

The imaging operation instruction unit 111 refers to the diffracted light spectral distribution acquirement completion table in the image data storage unit 110 and determines whether all completion flag fields of the spectral wavelength of the required diffracted light spectral distribution are set to 1, that is, whether sufficient diffracted light spectral distribution has been acquired for estimation of the spectral sensitivity. In this situation, the imaging operation instruction unit 111 determines whether the respective spectral wavelengths that matches all the spectral wavelengths in the required diffracted light spectral distribution set as discretized spectral wavelengths of 380 nm, 390 nm, . . . , 770 nm, 780 nm obtained by dividing, for example, a range from 380 nm to 780 nm by a wavelength period of 10 nm are included in the diffracted light spectral distribution. That is, the imaging operation instruction unit 111 determines whether the acquired diffracted light spectral distribution includes all the spectral wavelength of the required diffracted light spectral distribution set in advance.

As described above, the imaging operation instruction unit 111 refers respectively to the captured image data table for estimating spectral sensitivity and the diffracted light spectral distribution acquirement completion table in the image data storage unit 110 and determines whether sufficient diffracted light spectral distribution for estimation of the spectral sensitivity has been acquired based on whether each spectral wavelength of the required diffracted light spectral distribution is included in the acquired spectral wavelength of the diffracted light spectral distribution.

In this situation, if the diffracted light spectral distribution stored in the captured image data table for estimating spectral sensitivity includes all the spectral wavelength of the required diffracted light spectral distribution necessary for estimation of the spectral sensitivity, the imaging operation instruction unit 111 advances the process to step S27. Meanwhile, if the diffracted light spectral distribution stored in the captured image data table for estimating spectral sensitivity does not include all the spectral wavelength of the required diffracted light spectral distribution necessary for estimation of the spectral sensitivity, the imaging operation instruction unit 111 advances the process to step S29.

Step S27:

The camera sensitivity function estimation unit 107 then reads all the captured image data addresses and the diffracted light spectral distribution stored in the spectral sensitivity estimating captured image data table of the image data storage unit 110. The camera sensitivity function estimation unit 107 also reads the captured image data from the image data storage unit 110 using the captured image data address. The camera sensitivity function estimation unit 107 extracts a pixel position of the color calibration hologram 302 in the captured image data table read from the image data storage unit 110 using the coordinate transformation equation. The camera sensitivity function estimation unit 107 acquires the signal values of the respective RGB color components of the diffracted light from pixels in the color calibration hologram 302 and estimates the spectral sensitivity of the imaging unit 101 in combination with the diffracted light spectral distribution of respectively corresponding wavelengths.

Step S28:

The color calibration unit 108 performs color calibration of the captured image data P1 imaged by the imaging unit 101 to match the color of the captured image data P2 imaged by a standard imaging device based on the spectral sensitivity of the imaging unit 101 estimated by the camera sensitivity function estimation unit 107.

Step S29:

When sufficient diffracted light spectral distribution for estimation of the spectral sensitivity has not been acquired, the imaging operation instruction unit 111 displays an image to prompt recapturing of the captured image illustrated in FIG. 13 or 14 on the display screen of the display unit 109 to acquire the spectral wavelengths not yet acquired in the required diffracted light spectral distribution.

That is, the imaging operation instruction unit 111 displays instructions to change the observation angle on the display unit 109 to prompt a user to change the observation angle for imaging the credit card 300.

Step S30:

A user adjusts the imaging direction, that is, the observation angle of the captured image in accordance with the image displayed on the display screen of the display unit 109.

An authentication determination unit, not shown, then reads a reference pattern of the diffracted light (a true pattern of diffracted light) as if capturing the imaging object (authentication determination hologram 301) with the standard imaging device from the image data storage unit 110 in correspondence with the observation angle in capturing the captured image data.

The authentication determination unit also performs color calibration of the respective RGB color components of in a pixel region of the authentication determination hologram 301 in the captured image data using the already described spectral sensitivity estimated by the camera sensitivity function estimation unit 107. The authentication determination unit compares similarity between the pattern of the diffracted light in the captured image data subjected to the color calibration and the reference pattern thus read out and makes a determination as true if the similarity is a predetermined threshold or more while it makes a determination as false if the similarity is less than the predetermined threshold. The reference pattern is formed by color imaged by a standard imaging device.

According to the configuration described above, the actions and effects similar to those in the first embodiment can be obtained. The present embodiment further allows a user to acquire, by a simple imaging process, the diffracted light spectral distribution including all spectral wavelengths in the required diffracted light spectral distribution used for calibration by intuitively instructing a user, on the display screen, of the imaging direction for acquisition of a diffracted light spectral distribution used for calibration of the profile of hardware properties, and thus allows readily calibration of the profile of hardware properties used for color correction.

The present embodiment is also capable of obtaining all spectral wavelengths in the diffracted light spectral wavelengths necessary for calibration without omission by providing a notification of how to capture all captured images for calibration if there are any missing spectral wavelengths for calibration in the acquisition of diffracted light spectral distribution used for calibration of the profile of hardware properties, thereby allowing highly accurate calibration of the profile of hardware properties.

In the present embodiment, the presence of the spectral wavelengths necessary for calibration but not yet acquired are notified to a user by visual image display, and thus the user intentionally recognizes the missing spectral wavelengths and operates for acquirement. It is thus possible to obtain all diffracted light spectral wavelengths necessary for calibration without omission and allows highly accurate profile calibration.

That is, the hologram (e.g., the color calibration hologram 302) has properties that change in the image or in observed color depending on the observation angle. Accordingly, even a hologram designed for observation of a specific pattern or color has limited angles and positions for observation of the pattern and color. Therefore, when a user performs imaging with an imaging device, such as a camera, without understanding the properties of the hologram, observation has to be made in various imaging directions when the intended pattern or color is available and thus a user is sometimes not able to readily capture the image.

Even if understanding the properties of the hologram, a user has to correctly understand the three-dimensional positional relationship between the imaging device, the light source, and the hologram to determine how to move from the current observation angle and the current observation position to observe the intended pattern or color. It is thus difficult to image the light at each spectral wavelength radiated from the hologram.

As described earlier, for color calibration of an imaging device, various types of color have to be imaged such as a Macbeth color chart. Accordingly, for color calibration using reflected light with spectral distribution in a narrow band emitted from the hologram, it is difficult for a user to image target color, that is, diffracted light at a predetermined spectral wavelength. Accordingly, for observation of reflected light with respectively different color all at a time using many types of hologram for color calibration, the diffracted light at a predetermined spectral wavelength radiated from each hologram has to be imaged from a three-dimensional position satisfying all intended observation conditions for many holograms, and thus imaging of diffracted light for color calibration is very difficult. In the case of color calibration by imaging a hologram with varying color at the observation angle for various types of color while changing the observation angle as well, even if not all types of color necessary for color calibration are imaged, a user has no idea which color has not been imaged for color calibration and thus the imaging device has to be variously moved, sometimes causing inconvenient color calibration. To cope with this problem, to facilitate hologram imaging by a user, the present embodiment has a configuration of giving intuitive instruction to a user of acquisition of a diffracted light spectral distribution used for calibration of the profile of hardware properties.

As described above, in the present embodiment, in contrast to a reflector with diffuse reflection properties such as a Macbeth color chart, a hologram is used as a reflector producing color by the light diffraction. General reflective holograms include a rainbow hologram reflecting diffracted light by a metal foil and a Lippmann hologram reflecting by the diffraction of the hologram itself. A full color hologram develops color by diffraction of light incident to the diffraction grating on the surface and thus radiated light with certain spectral distribution is capable of emitting diffracted light with diffracted light spectral distribution in a narrow band. Accordingly, depending on design of the hologram, diffracted light radiated to incident light may be adjusted at the wavelength distribution level to reproduce arbitrary color (light of spectral distribution).

In the present embodiment, whether the diffracted light spectral distribution is sufficient for estimation of the spectral sensitivity is determined by determination of whether the spectral wavelength of the required diffracted light spectral distribution set in advance is sufficient.

However, without setting of the required diffracted light spectral distribution, whether the diffracted light spectral distribution is sufficient for estimation of the spectral sensitivity may be configured to be determined by, for example, referring to the captured image data table for estimating spectral sensitivity of the image data storage unit 110 to see whether a spectral wavelength in the diffracted light spectral distribution imaged earlier has been acquired with uniform wavelength periods in the visible wavelength range. For example, when the region of spectral wavelengths is set with a wavelength period of 10 nm or the like, the imaging operation instruction unit 111 determines that the diffracted light spectral distribution sufficient for estimation of the spectral sensitivity is obtained by acquirement of diffracted light of at least one spectral wavelength in each region. Meanwhile, when the obtained diffracted light spectral distribution is not sufficient for estimation of the spectral sensitivity, that is, there is a region in the spectral wavelengths where the diffracted light is not yet imaged, the imaging operation instruction unit 111 obtains the diffracted light in the wavelength region as the diffracted light necessary for estimation of the spectral sensitivity. The imaging operation instruction unit 111 then calculates the observation angle to image the diffracted light of the spectral wavelength thus obtained and provides instructions of the imaging direction as described earlier to guide a user to image the diffracted light of the spectral wavelength necessary for estimation of the spectral sensitivity.

Fourth Embodiment

Hereinafter, with reference to the drawings, a fourth embodiment of the present invention will be described. In the description of the present embodiment, an identical reference sign is given to components that are the same as those in the first to third embodiments to omit redundant description.

Figure 16:
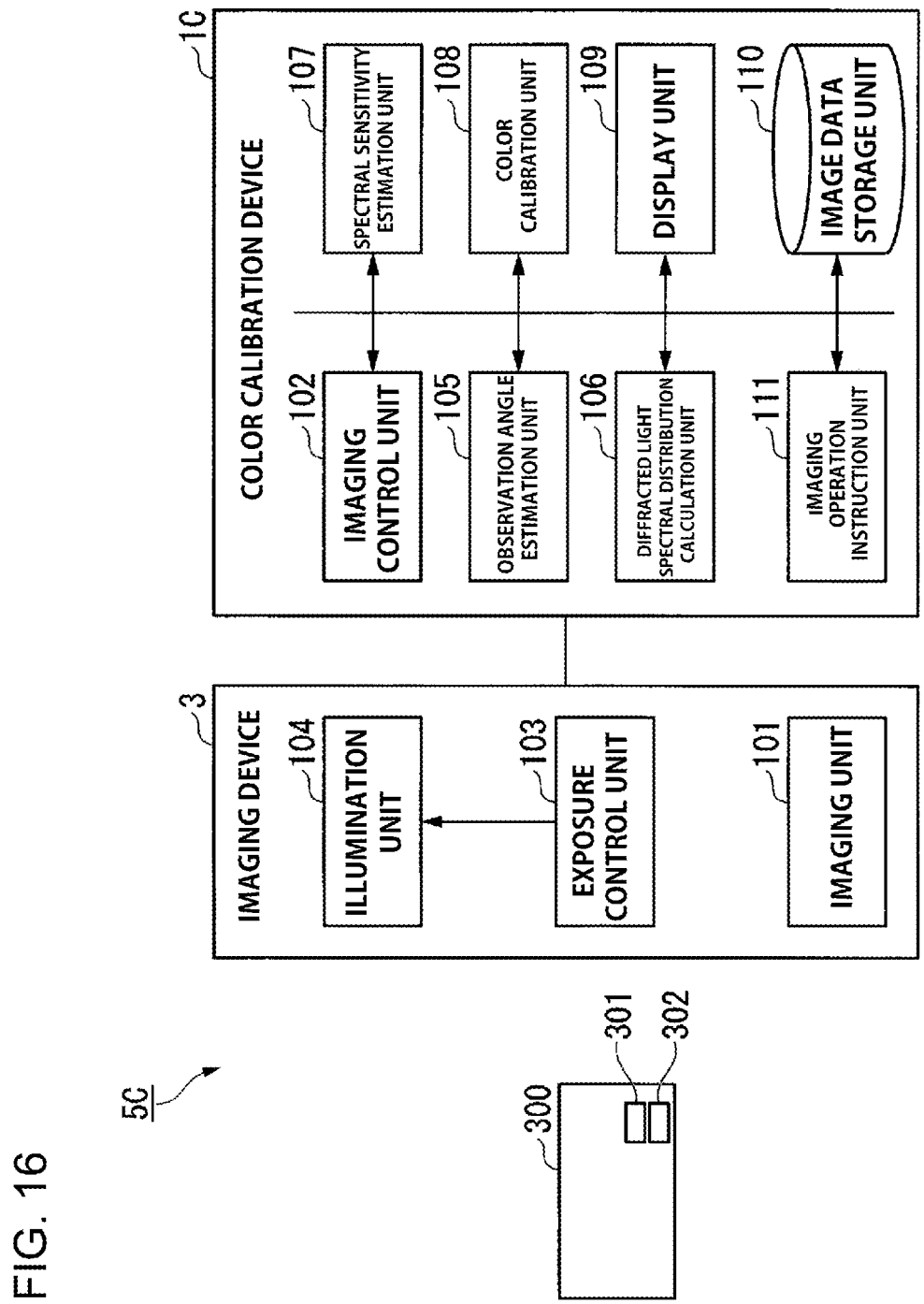
FIG. 16 is a block diagram illustrating an exemplary configuration of a color calibration system provided with a color calibration device in a fourth embodiment.

FIG. 16 is a block diagram illustrating an exemplary configuration of a color calibration system in the fourth embodiment. In FIG. 16, a color calibration system 5C is provided with a color calibration device 1C and the imaging device 3. The color calibration device 1C is provided with the imaging control unit 102, the observation angle estimation unit 105, the diffracted light spectral distribution calculation unit 106, the imaging operation instruction unit 111, the camera sensitivity function estimation unit 107, the color calibration unit 108, the display unit 109, and the image data storage unit 110. The imaging device 3 is also provided with the imaging unit 101, the exposure control unit 103, and the illumination unit 104. In the present embodiment, the color calibration system 5C is configured with the color calibration device 1C and the color calibration hologram 302. In FIG. 16, an identical reference sign is given to the configuration same as that in the third embodiment.

In the present embodiment, the color calibration system 5C is configured to have the imaging device 3 providing the functions of imaging and light exposure in the third embodiment separated from the color calibration device 1A. This allows an imaging device as a color calibration object, such as a general purpose digital camera or a mobile terminal (including a mobile phone and a smartphone), to be controlled from an externally connected device and also allows handling of a plurality of imaging devices.

The color calibration device 1C may have a cloud configuration, although not shown, to allow communication with a digital camera or a mobile terminal using an information communication circuit, such as the internet. The color calibration device 1C may have a configuration to perform a color calibration process of the imaging device using captured image data sent from a digital camera or a mobile terminal similarly to the third embodiment described earlier.

A program to achieve the functions of the color calibration device 1 in FIG. 1, the color calibration device 1A in FIG. 10, the color calibration device 1B in FIG. 11, and the color calibration device 1C in FIG. 16 of the present invention may be recorded on a computer readable storage medium to cause a computer system to read the program recorded in the storage medium for execution to process color calibration of captured image data between imaging devices. The "computer system" in this context includes an OS (Operating System) and hardware such as peripherals.

The "computer system" also includes the WWW (World Wide Web) system provided with a web site providing environment (or display environment). The "computer readable storage medium" refers to a portable medium, such as a flexible disk, a magneto-optical disk, a ROM (Read Only Memory), and a CD-ROM (Compact Disc-Read Only Memory), and a storage device, such as a hard disk built in a computer system. The "computer readable storage medium" also includes a medium to hold a program for a certain period, such as a volatile memory (a RAM (Random Access Memory)) inside a computer system which is a server or a client when the program is sent via a network, such as the internet, or a communication circuit, such as a telephone line.

The foregoing program may be transmitted from the computer system storing the program in the storage device or the like to another computer system via a transmission medium or a transmission wave in the transmission medium. The "transmission medium" transmitting the program here means a medium having a function of transmitting information like a network (communication network) such as the internet or a communication line (communication wire) such as a phone line. The foregoing program may be designed to implement some of the functions described above. Further, the program may be a program implementing the foregoing functions by combination with a program already recorded in the computer system, that is, a differential file (differential program).

Although the first to fourth embodiments use the observation angle estimation unit 105, the color calibration device and the color calibration system of the present invention may be configured not to be provided with the observation angle estimation unit 105.

The observation angle estimation unit 105 estimates the observation angle and the observation position from the captured image data imaged by the imaging unit 101. Meanwhile, if the current observation angle and the observation position of the imaging unit 101 are available from a detecting device, such as a sensor and an encoder, the diffracted light spectral distribution at each observation angle may be calculated by the diffracted light spectral distribution calculation unit 106 using the observation angle and the observation position acquired by the detecting device.

REFERENCE SIGNS LIST

1, 1A, 1B, 1C Color calibration device; 2, 3 Imaging device; 101 Imaging unit (Imaging device); 102 Imaging control unit; 103 Exposure control unit; 104 Illumination unit; 105 Observation angle estimation unit; 106 Diffracted light spectral distribution calculation unit; 107 Camera sensitivity function estimation unit; 108 Color calibration unit; 109 Display unit; 110 Image data storage unit; 300 Credit card; 301 Authentication determination hologram (Anti-counterfeiting medium, Imaging object); 302 Color calibration hologram; 500 Hologram color calibration sheet.

What is claimed is:

1. A color calibration method, calibrating colors in a captured image of a first imaging device between different imaging devices using a hologram emitting diffracted light at different frequencies corresponding to an observation angle, the color calibration method comprising:
a step of calculating diffracted light spectral distribution to obtain respective diffracted light spectral distribution of the diffracted light from the hologram;
a step of estimating a spectral sensitivity to estimate spectral sensitivity of the imaging device from the respective diffracted light spectral distribution of the diffracted light and each captured image of the diffracted light; and
a step of calibrating colors to calibrate difference in color of the first imaging device relative to a second imaging device different from the first imaging device using the estimated spectral sensitivity.

2. The color calibration method of claim 1, further comprising a step of instructing an imaging operation to output information instructing an operation to capture all captured images having diffracted light spectral distribution respectively corresponding to a plurality of items of required diffracted light spectral distribution set in advance.

3. A non-transitory computer readable medium stored in a computer and causing the computer to execute an operation to calibrate colors in a captured image of a first imaging device between different imaging devices using a hologram emitting diffracted light at different frequencies corresponding to an observation angle, the medium causing the computer to perform operations comprising:
obtaining respective diffracted light spectral distribution of the diffracted light from the hologram;
estimating spectral sensitivity of the imaging device from the respective diffracted light spectral distribution of the diffracted light and each captured image of the diffracted light; and
calibrating difference in color of the first imaging device relative to a second imaging device different from the first imaging device using the estimated spectral sensitivity.

4. The non-transitory computer readable medium of claim 3, wherein the operations further comprise outputting information instructing an operation to capture all captured images having diffracted light spectral distribution respectively corresponding to a plurality of items of required diffracted light spectral distribution set in advance.

5. A method of calibrating colors in a captured image of a first imaging device between different imaging devices using a hologram emitting diffracted light at different frequencies corresponding to an observation angle, the method comprising:
obtaining a respective diffracted light spectral distribution of the diffracted light from the hologram;
estimating spectral sensitivity of the imaging device from the respective diffracted light spectral distribution of the diffracted light and each captured image of the diffracted light; and
calibrating difference in color of the first imaging device relative to a second imaging device different from the first imaging device using the estimated spectral sensitivity.

6. The method of claim 5, further comprising estimating an observation angle and an observation position for imaging of the hologram from the captured image imaged by the imaging device; and
calculating the respective diffracted light spectral distribution of the diffracted light using the observation angle and the observation position estimated from each captured image of the diffracted light.

7. The method of claim 5, wherein said estimating the spectral sensitivity of the imaging device comprises estimating the spectral sensitivity of the imaging device from the respective diffracted light spectral distribution of the diffracted light and respective light intensity of the captured image of the diffracted light at a corresponding frequency.

8. The method of claim 5, further comprising outputting information instructing an operation to capture all captured images having diffracted light spectral distribution respectively corresponding to a plurality of items of required diffracted light spectral distribution set in advance.

9. The method of claim 8, wherein said outputting the information comprises determining whether a captured image having diffracted light spectral distribution corresponding to the required diffracted light spectral distribution has been imaged, and if the captured image having the diffracted light spectral distribution has not been imaged, outputting a notification to prompt imaging of the captured image having the diffracted light spectral distribution on a display of the imaging device.

10. The method of claim 9, wherein said outputting the notification comprises displaying on the display an imaging direction for imaging a captured image having diffracted light spectral distribution corresponding to the required diffracted light spectral distribution and not yet obtained.

11. The method of claim 10, wherein said displaying on the display the imaging direction comprises displaying an imaging frame of the hologram to define an imaging position of the captured image on the display for imaging of a captured image having diffracted light spectral distribution corresponding to the required diffracted light spectral distribution.

* * * * *